(12) United States Patent
Suzuki et al.

(10) Patent No.: US 9,440,724 B2
(45) Date of Patent: Sep. 13, 2016

(54) BOAT MANEUVERING SYSTEM

(71) Applicant: YAMAHA HATSUDOKI KABUSHIKI KAISHA, Shizuoka-ken (JP)

(72) Inventors: Takayoshi Suzuki, Shizuoka-Ken (JP); Noriyoshi Hiraoka, Shizuoka-Ken (JP); Akihiro Onoue, Shizuoka-Ken (JP); Atsushi Kumita, Shizuoka-Ken (JP); Yoshiaki Tasaka, Shizuoka-Ken (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 0 days.

(21) Appl. No.: 14/840,868

(22) Filed: Aug. 31, 2015

(65) Prior Publication Data

US 2016/0096611 A1 Apr. 7, 2016

(30) Foreign Application Priority Data

Oct. 2, 2014 (JP) .................................. 2014-204196

(51) Int. Cl.
*B63H 25/42* (2006.01)
*G05D 1/02* (2006.01)

(52) U.S. Cl.
CPC ............ *B63H 25/42* (2013.01); *G05D 1/0206* (2013.01)

(58) Field of Classification Search
CPC .............................. B63H 25/42; G05D 1/0206
See application file for complete search history.

(56) References Cited

U.S. PATENT DOCUMENTS 8,113,892 B1 * 2/2012 Gable .................... B63H 21/21
114/144 RE

FOREIGN PATENT DOCUMENTS

JP 2011-140272 A 7/2011

* cited by examiner

*Primary Examiner* — Rodney Butler
(74) *Attorney, Agent, or Firm* — Rankin & Berdo, P.C.

(57) ABSTRACT

A boat maneuvering system, including a first power source having a first controller, a first operating device having a second controller configured to receive a first operation instruction and to output a first control signal for controlling the first power source, a second power source provided separately from the first power source, and a second operating device provided separately from the first operating device for operating the first and second power sources. The second operating device includes a third controller provided on a communication path connecting the first and second controllers, the third controller being configured to receive the first control signal, generate a second control signal, and output the second control signal to the first controller, and to receive a second operation instruction via the second operating device, generate a third control signal, and output the third control signal to the second power source.

27 Claims, 9 Drawing Sheets

FIRST EMBODIMENT

FIRST EMBODIMENT

FIG.2  BEFORE ADDITION OF JOYSTICK AND THRUSTERS

THIRD EMBODIMENT

BOAT MANEUVERING SYSTEM

CROSS-REFERENCE TO RELATED APPLICATION

The application claims foreign priority benefits to Japanese patent application number JP2014-204196, filed Oct. 2, 2014 (entitled "Boat Maneuvering System," by Takayoshi Suzuki, Noriyoshi Hiraoka, Akihiro Onoue, Atsushi Kumita, and Yoshiaki Tasaka), which is hereby incorporated by reference in its entirety.

BACKGROUND OF THE INVENTION

1. Field of the Invention

The present invention relates to a boat maneuvering system.

2. Description of the Background Art

A boat maneuvering system is known in general. Such a boat maneuvering system is disclosed in Japanese Patent Laying-Open No. 2011-140272, for example.

The aforementioned Japanese Patent Laying-Open No. 2011-140272 discloses a boat maneuvering system including an outboard motor mounted on a boat body, an engine ECU (electronic control unit) that controls the outboard motor, a remote controller configured to operate the outboard motor, a joystick provided separately from the remote controller, configured to operate the outboard motor, and a boat body ECU that accepts operation instruction inputs from the remote controller and the joystick and outputs control signals to the engine ECU. In this boat maneuvering system, a boat maneuvering mode is switched, whereby a boat is maneuvered using the remote controller or the joystick.

In the boat maneuvering system according to the aforementioned Japanese Patent Laying-Open No. 2011-140272, the boat body ECU has a function of receiving an operation signal from the joystick in addition to the remote controller, and hence the boat maneuvering mode is switched, whereby the boat is maneuvered using the remote controller or the joystick. In the case where a boat body ECU has no function of receiving an operation signal from a joystick, however, a device such as the joystick is not capable of being added to a boat maneuvering system including no joystick at a later time. Thus, in general, a boat maneuvering system allowing a new operating device and a new power source to be easily added to an existing boat maneuvering system is required.

SUMMARY OF THE INVENTION

The present invention relates to a boat maneuvering system designed to allow a new operating device and a new power source to be easily added thereto.

A boat maneuvering system according to a first aspect of the present invention includes a first power source mounted on a boat body, a first controller that controls the first power source, a first operating device configured to operate the first power source, a second controller that accepts an operation instruction input from the first operating device and outputs a control signal to the first controller, a communication path that connects the first controller and the second controller to convey a signal therebetween, a second power source provided separately from the first power source, a second operating device provided separately from the first operating device, configured to operate the first power source and the second power source, and a third controller that is provided on the communication path, accepts a control signal from the second controller and an operation instruction input from the second operating device, and generates a control signal output to the first controller and a control signal output to the second power source.

In the boat maneuvering system according to the first aspect, as hereinabove described, the third controller that accepts the control signal from the second controller and the operation instruction input from the second operating device and generates the control signal output to the first controller and the control signal output to the second power source is provided on the communication path between the first controller and the second controller. Thus, even when the second power source and the second operating device are newly added to an existing boat maneuvering system, the third controller relays the control signal for operation of the first power source by the existing first operating device and enables the operation of the first power source by the existing first operating device. The third controller generates the control signals for operation of the second power source and the first power source by the second operating device and enables the operation of the second power source and the first power source by the second operating device. Consequently, a new operating device (second operating device) and a new power source (second power source) are easily added to the existing boat maneuvering system.

In the aforementioned boat maneuvering system according to the first aspect, the first operating device preferably includes at least one of a remote controller and a steering wheel. According to this structure, a new operating device and a new power source are easily added to the existing boat maneuvering system including at least one of the remote controller and the steering wheel.

In the aforementioned boat maneuvering system according to the first aspect, the second operating device preferably includes a joystick, and the third controller preferably generates the control signals output to the first controller and the second power source on the basis of operation by the joystick. According to this structure, the joystick is easily added to the existing boat maneuvering system to maneuver a boat.

In the aforementioned boat maneuvering system according to the first aspect, the third controller preferably accepts an input of a control signal from the first controller and outputs the control signal to the second controller. According to this structure, even when an operating device and a power source are newly added to the existing boat maneuvering system, a control signal containing information such as the state of the power source is reliably transmitted from the first controller to the second controller through the third controller.

In the aforementioned boat maneuvering system according to the first aspect, the third controller preferably does not accept operation by the second operating device when the first operating device is operated and the control signal is output from the second controller. According to this structure, an operation on the first operating device is prioritized, and the control signal is transmitted to the first power source, whereby crosstalk between a control signal based on an operation on the first operating device and a control signal based on an operation on the second operating device is prevented.

In the aforementioned boat maneuvering system according to the first aspect, the third controller preferably switches between a first mode of accepting operation by the first operating device and a second mode of accepting operation by the second operating device and accepts the operation by the second operating device only when the second mode is selected. According to this structure, boat maneuvering by the second operating device is prevented in the first mode.

In this case, the first operating device preferably includes a remote controller, and the third controller is preferably capable of switching the first mode to the second mode when the remote controller is neutral. According to this structure, the first mode is capable of being switched to the second mode when the remote controller is neutral and the propulsion power of the first power source is substantially zero, and hence action of an excessive change in the propulsion power on the boat is significantly reduced or prevented when the mode is switched.

In the aforementioned structure of switching between the first mode and the second mode, the third controller preferably switches the second mode to the first mode when the first operating device is operated in the second mode. According to this structure, in the case where an operation of sailing the boat is performed in the first mode after an operation of moving the boat away from a pier is performed in the second mode, for example, the second mode is automatically switched to the first mode by performing operation by the first operating device after the boat is moved away from a pier by operation in the second mode, and hence an operation of moving the boat away from a pier is promptly shifted to an operation of sailing the boat.

In the aforementioned structure of switching between the first mode and the second mode, the control signal that the third controller outputs to the first controller preferably includes at least a start signal and a stop signal for the first power source, and the third controller preferably outputs the stop signal for the first power source to the first controller when the first mode is switched to the second mode. According to this structure, the propulsion power of the first power source is reduced to zero when the first mode is shifted to the second mode, and hence action of an excessive change in the propulsion power on the boat is significantly reduced or prevented when the mode is switched.

In this case, the third controller preferably outputs the start signal for the first power source to the first controller when the second mode is switched to the first mode. According to this structure, boat maneuvering by operating the second power source in the second mode is easily shifted to boat maneuvering by operating the first power source in the first mode.

In the aforementioned structure of switching between the first mode and the second mode, a plurality of first power sources are preferably provided, and the third controller is preferably capable of outputting different control signals to the plurality of first power sources in the second mode. According to this structure, the third controller controls the directions and outputs of the plurality of first power sources, whereby the boat is easily maneuvered fore-and-aft and side-to-side and turned in the second mode.

In this case, each of the plurality of first power sources is preferably provided with the first controller, and the third controller is preferably arranged on the communication path between a plurality of first controllers and the second controller. According to this structure, a new operating device and a new power source are easily added to the existing boat maneuvering system including the plurality of first power sources.

In the aforementioned boat maneuvering system according to the first aspect, the second power source preferably includes at least one of a thruster and a trolling motor. According to this structure, at least one of the thruster and the trolling motor is easily added to the existing boat maneuvering system, and the boat is easily maneuvered when moving away from a pier, coming alongside a pier, and trolling.

In the aforementioned boat maneuvering system according to the first aspect, the first power source preferably includes an engine, the first operating device preferably includes a drive-by-wire remote controller and outputs at least an engine start signal for the first power source, and the third controller preferably accepts the engine start signal from the first operating device and outputs the engine start signal to the first controller. According to this structure, a new operating device and a new power source are easily added to the existing boat maneuvering system including the engine and the drive-by-wire remote controller.

A boat maneuvering system according a second aspect of the present invention includes a power source mounted on a boat body, a first controller that controls the power source, a first operating device configured to operate the power source, a second controller that accepts an operation instruction input from the first operating device and outputs a control signal to the first controller, a communication path that connects the first controller and the second controller to convey a signal therebetween, a second operating device provided separately from the first operating device, configured to operate the power source, and a third controller that is provided on the communication path, accepts a control signal from the second controller and an operation instruction input from the second operating device, and generates a control signal output to the first controller.

In the boat maneuvering system according to the second aspect, as hereinabove described, the third controller that accepts the control signal from the second controller and the operation instruction input from the second operating device and generates the control signal output to the first controller is provided on the communication path between the first controller and the second controller. Thus, even when the second operating device is newly added to an existing boat maneuvering system, the third controller relays the control signal for operation of the power source by the existing first operating device and enables the operation of the power source by the existing first operating device. The third controller generates the control signal for operation of the power source by the second operating device and enables the operation of the power source by the second operating device. Consequently, a new operating device (second operating device) is easily added to the existing boat maneuvering system.

In the aforementioned boat maneuvering system according to the second aspect, the first operating device preferably includes at least one of a remote controller and a steering wheel. According to this structure, a new operating device is easily added to the existing boat maneuvering system including at least one of the remote controller and the steering wheel.

In the aforementioned boat maneuvering system according to the second aspect, the second operating device preferably includes a joystick. According to this structure, the joystick is easily added to the existing boat maneuvering system to maneuver a boat.

In the aforementioned boat maneuvering system according to the second aspect, the third controller preferably accepts an input of a control signal from the first controller and outputs the control signal to the second controller. According to this structure, even when an operating device is newly added to the existing boat maneuvering system, a control signal containing information such as the state of the power source is reliably transmitted from the first controller to the second controller through the third controller.

In the aforementioned boat maneuvering system according to the second aspect, the third controller preferably does not accept operation by the second operating device when the first operating device is operated and the control signal is output from the second controller. According to this structure, an operation on the first operating device is prioritized, and the control signal is transmitted to the power source, whereby crosstalk between a control signal based on an operation on the first operating device and a control signal based on an operation on the second operating device is prevented.

In the aforementioned boat maneuvering system according to the second aspect, the third controller preferably switches between a first mode of accepting operation by the first operating device and a second mode of accepting operation by the second operating device and accepts the operation by the second operating device only when the second mode is selected. According to this structure, boat maneuvering by the second operating device is prevented in the first mode.

In this case, the first operating device preferably includes a remote controller, and the third controller is preferably capable of switching the first mode to the second mode when the remote controller is neutral. According to this structure, the first mode is capable of being switched to the second mode when the remote controller is neutral and the propulsion power of the power source is substantially zero, and hence action of an excessive change in the propulsion power on the boat is significantly reduced or prevented when the mode is switched.

In the aforementioned structure of switching between the first mode and the second mode, the third controller preferably switches the second mode to the first mode when the first operating device is operated in the second mode. According to this structure, in the case where an operation of sailing the boat is performed in the first mode after an operation of moving the boat away from a pier is performed in the second mode, for example, the second mode is automatically switched to the first mode by performing operation by the first operating device after the boat is moved away from a pier by operation in the second mode, and hence an operation of moving the boat away from a pier is promptly shifted to an operation of sailing the boat.

In the aforementioned structure of switching between the first mode and the second mode, a plurality of power sources are preferably provided, and the third controller is preferably capable of outputting different control signals to the plurality of power sources in the second mode. According to this structure, the third controller moves the boat in an intended direction by operating the plurality of power sources individually in the second mode.

In this case, each of the plurality of power sources is preferably provided with the first controller, and the third controller is preferably arranged on the communication path between a plurality of first controllers and the second controller. According to this structure, the third controller controls the directions and outputs of the plurality of power sources, whereby the boat is easily maneuvered fore-and-aft and side-to-side and turned in the second mode.

A boat maneuvering system according to a third aspect of the present invention includes a first power source mounted on a boat body, a first controller that controls the first power source, an operating device configured to operate the first power source, a second controller that accepts an operation instruction input from the operating device and outputs a control signal to the first controller, a communication path that connects the first controller and the second controller to convey a signal therebetween, a second power source provided separately from the first power source, and a third controller that is provided on the communication path, accepts a control signal from the second controller, and generates a control signal output to the first controller and a control signal output to the second power source.

In the boat maneuvering system according to the third aspect, as hereinabove described, the third controller that accepts the control signal from the second controller and generates the control signal output to the first controller and the control portion output to the second power source is provided on the communication path between the first controller and the second controller. Thus, even when the second power source is newly added to an existing boat maneuvering system, the third controller generates the control signal (relays the control signal) on the basis of the control signal for operation of the first power motor by the existing operating device and enables the operation of the first power source by the existing operating device. The third controller generates the control signals for operation of the second power source and the first power source by the operating device and enables the operation of the first power source and the second power source by the operating device. Consequently, a new power source (second power source) is easily added to the existing boat maneuvering system.

In the aforementioned boat maneuvering system according to the third aspect, the second power source preferably includes at least one of a thruster and a trolling motor. According to this structure, at least one of the thruster and the trolling motor is easily added to the existing boat maneuvering system, and the boat is easily maneuvered when moving away from a pier, coming alongside a pier, and trolling.

In the aforementioned boat maneuvering system according to the third aspect, the first power source preferably includes an engine, the operating device preferably includes a drive-by-wire remote controller and outputs at least an engine start signal for the first power source, and the third controller preferably accepts the engine start signal from the operating device and outputs the engine start signal to the first controller. According to this structure, a new power source is easily added to the existing boat maneuvering system including the engine and the drive-by-wire remote controller.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a boat maneuvering system 100 according to a first embodiment of the present invention is now described with reference to FIGS. 1 to 3. In the figure, arrow FWD represents the forward movement direction of a boat, and arrow BWD represents the reverse movement direction of the boat. Furthermore, in the figure, arrow R represents the starboard direction of the boat, and arrow L represents the portside direction of the boat.

Figure 1:
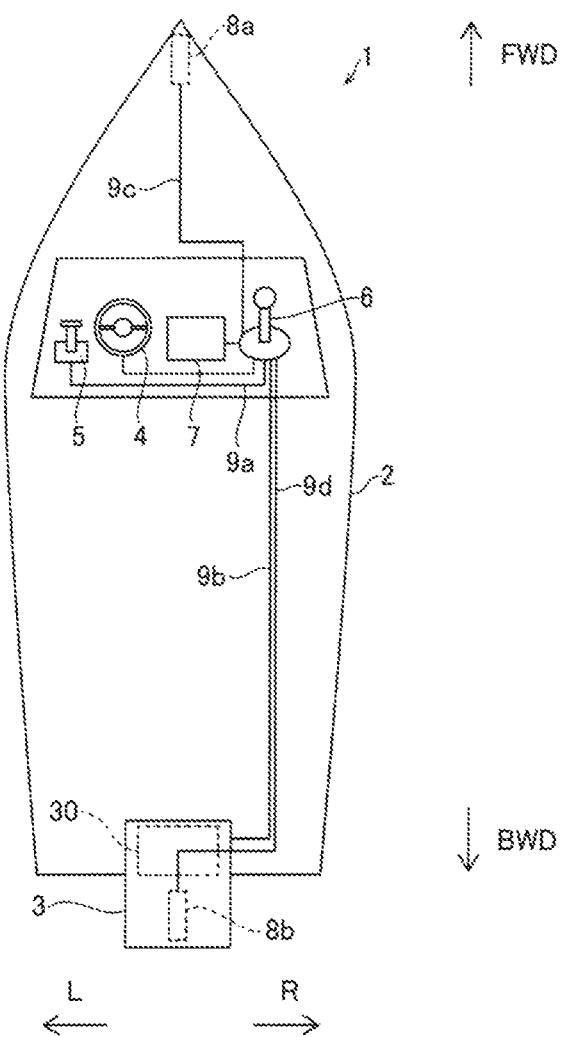
FIG. 1 is a diagram showing a boat including a boat maneuvering system according to a first embodiment of the present invention.

The boat maneuvering system 100 (see FIG. 3) is provided to maneuver a boat 1 shown in FIG. 1. The boat 1 is provided with a boat body 2, an outboard motor 3 mounted on a rear portion of the boat body 2, configured to propel the boat body 2, a steering wheel 4 configured to steer the boat body 2 (turn the outboard motor 3), a remote controller 5 configured to operate the shift and output (throttle position) of the outboard motor 3, a joystick 6 configured to steer the boat body 2, an indicator 7, thrusters 8a and 8b provided on front and rear portions (a bow and a stern) of the boat body 2, respectively, and communication paths 9a, 9b, 9c, and 9d that communicatively connect each device, as shown in FIG. 1. The boat 1 includes batteries 10a and 10b, as shown in FIG. 3. The outboard motor 3 is an example of the "first power source" in the present invention, and the steering wheel 4 and the remote controller 5 are examples of the "first operating device" in the present invention. The joystick 6 is an example of the "second operating device" in the present invention, and the thrusters 8a and 8b are examples of the "second power source" in the present invention.

The single outboard motor 3 is mounted on the rear portion of the boat body 2. The outboard motor 3 includes an engine 30. The outboard motor 3 is arranged to extend to below the engine 30 and includes a drive shaft that conveys the drive force of the engine 30, one propeller shaft that extends in a direction orthogonal to (intersecting with) the drive shaft, and one propeller mounted on a rear end portion of the propeller shaft, rotated together with the propeller shaft.

A boat maneuvering system 100a before addition of the joystick 6 and the thrusters 8a and 8b is now described with reference to FIG. 2.

Figure 2:
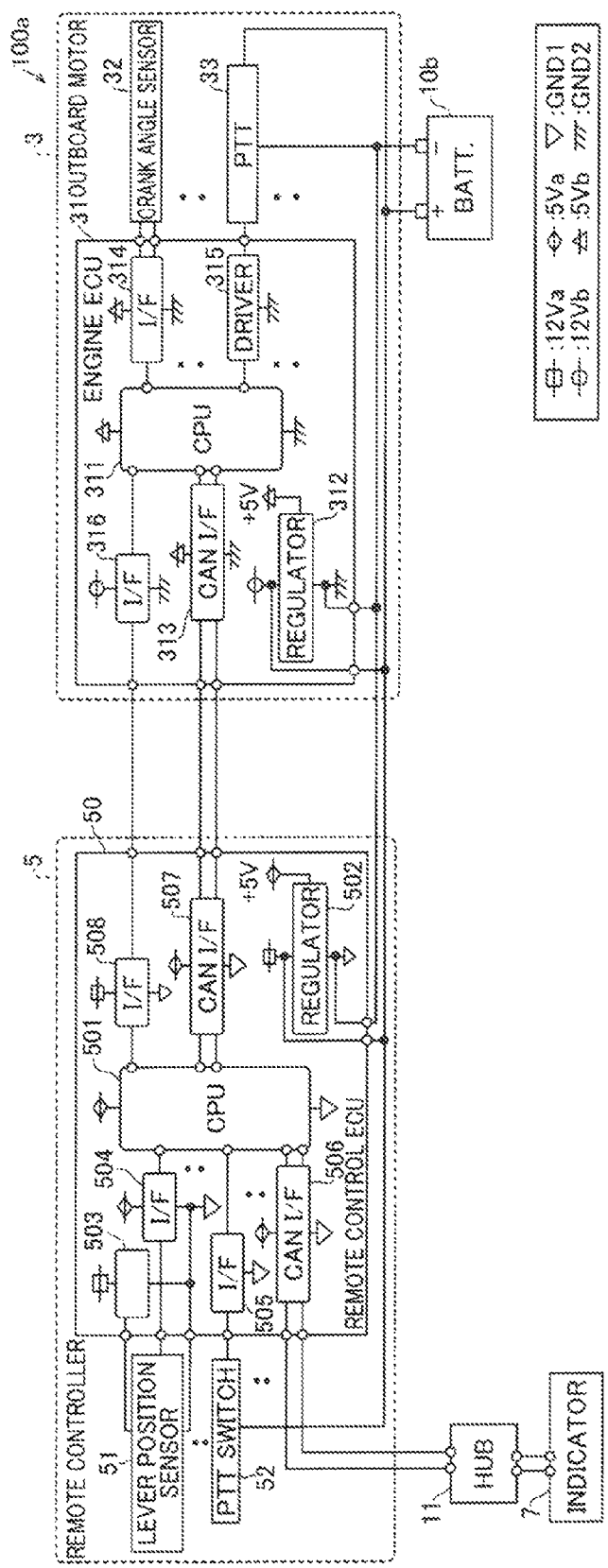
FIG. 2 is a circuit diagram schematically showing the boat maneuvering system according to the first embodiment of the present invention before addition of a joystick and thrusters.

As shown in FIG. 2, in the boat maneuvering system 100a, the remote controller 5 and the outboard motor 3 are directly communicatively connected to each other through CAN communication before addition of the joystick 6. Specifically, the remote controller 5 (remote control ECU 50) and the outboard motor 3 (engine ECU 31) are connected to each other by communication lines. In other words, a CPU 501 of the remote controller 5 and a CPU 311 of the outboard motor 3 are communicatively connected to each other through CAN I/Fs 507 and 313.

Electric power is supplied to the remote controller 5 from the battery 10b, similarly to the outboard motor 3. The remote controller 5 (remote control ECU 50) and the indicator 7 are connected to each other by communication lines. In other words, the CPU 501 of the remote controller 5 and the indicator 7 are communicatively connected to each other through a CAN I/F 506 and a hub 11.

The boat maneuvering system 100 after addition of the joystick 6 and the thrusters 8a and 8b is now described with reference to FIG. 3.

Figure 3:
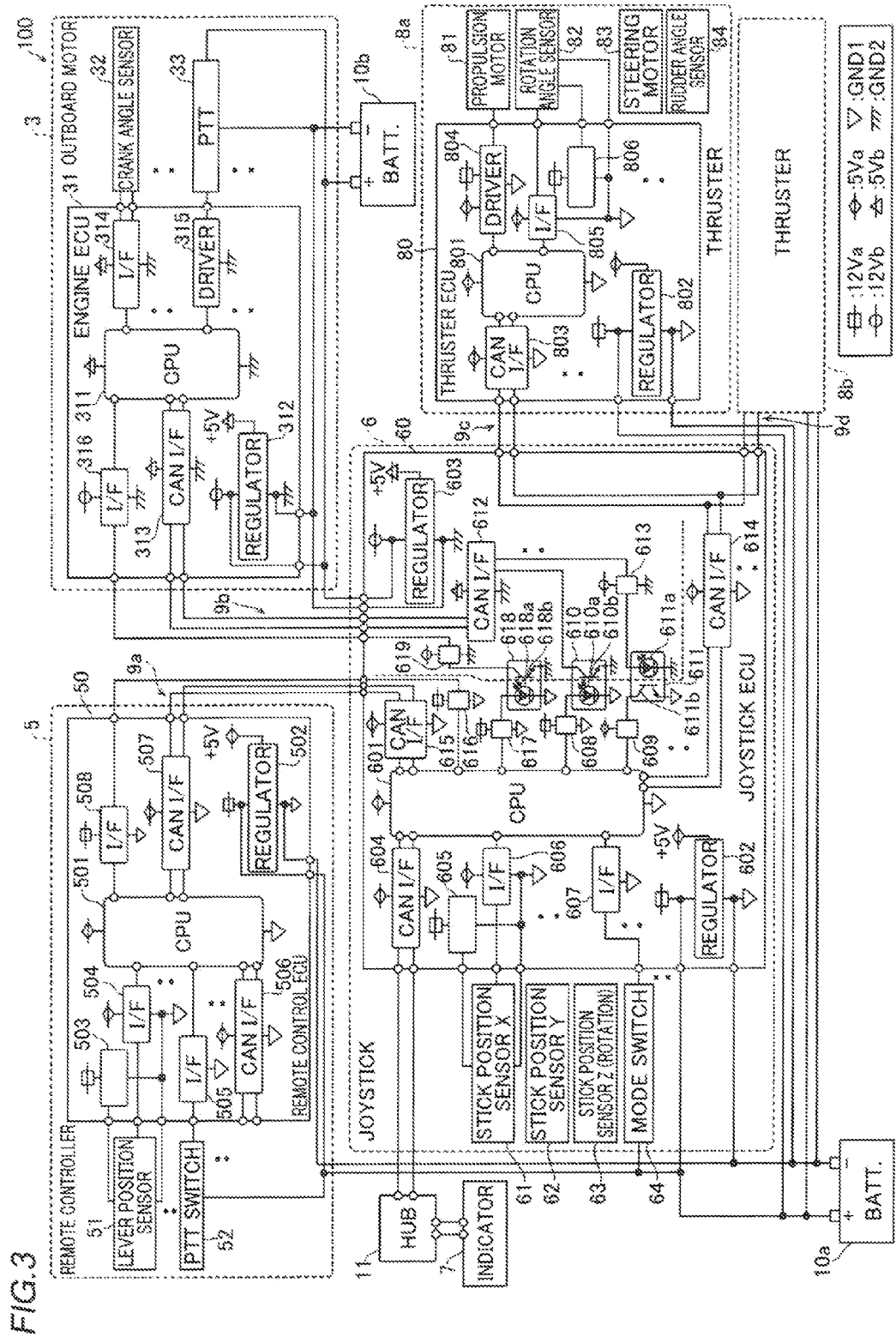
FIG. 3 is a circuit diagram schematically showing the boat maneuvering system according to the first embodiment of the present invention.

The outboard motor 3 may include the engine ECU (electronic control unit) 31, a crank angle sensor 32, and a PTT (power trim tilt) 33 as the control structure, as shown in FIG. 3. The engine ECU 31 is an example of the "first controller" in the present invention. The engine ECU 31 may also be disposed outside of the outboard motor 3.

The engine ECU 31 includes the CPU (central processing unit) 311, a regulator 312, the CAN (controller area network) I/F (interface) 313, an I/F 314, and a driver 315.

The remote controller 5 may include the remote control ECU (electronic control unit) 50, a lever position sensor 51, and a PTT switch 52 as the control structure, as shown in FIG. 3. In other words, the remote controller 5 and the remote control ECU 50 are unitized. The remote controller 5 is mounted in the vicinity of an operator's seat located in the front portion of the boat 2. The remote control ECU 50 includes the CPU 501, a regulator 502, a power supply circuit 503, I/Fs 504 and 505, the CAN I/Fs 506 and 507, and an I/F 508. The remote control ECU 50 is an example of the "second controller" in the present invention. The remote control ECU 50 may also be disposed outside of the remote controller 5.

The joystick 6 may include a joystick ECU 60, a stick position sensor X 61, a stick position sensor Y 62, a stick position sensor Z 63, and a mode switch 64 as the control structure, as shown in FIG. 3. The joystick ECU 60 is an example of the "third controller" in the present invention. The joystick ECU 60 may also be disposed outside of the joystick 6.

The joystick ECU 60 includes a CPU 601, regulators 602 and 603, a CAN I/F 604, a power supply circuit 605, I/Fs 606 and 607, a driver 608, an I/F 609, photocouplers 610 and 611, a CAN I/F 612, a driver 613, CAN I/Fs 614 and 615, an I/F 616, a driver 617, a photocoupler 618, and an I/F 619.

The thrusters 8a and 8b have the same structure, and the structure of the thruster 8b is omitted in FIG. 3. The thruster 8a (8b) includes a thruster ECU 80, a propulsion motor 81, a rotation angle sensor 82, a steering motor 83, and a rudder angle sensor 84, as the control structure.

The thruster ECU 80 includes a CPU 801, a regulator 802, a CAN I/F 803, a driver 804, an I/F 805, and a power supply circuit 806.

The outboard motor 3, the remote controller 5, the joystick 6, and the thrusters 8a and 8b are communicatively connected to each other by CAN communication through the communication paths 9a to 9d. Specifically, the remote controller 5 (remote control ECU 50) is connected to the joystick 6 (joystick ECU 60) through the communication path 9a. The outboard motor 3 (engine ECU 31) is connected to the joystick 6 (joystick ECU 60) through the communication path 9b. The thrusters 8a and 8b (thruster ECUs 80) are connected to the joystick 6 (joystick ECU 60) through the communication paths 9c and 9d, respectively. In other words, the remote controller 5, which is an operating device, is communicatively connected to the outboard motor 3 and the thrusters 8a and 8b, which are power sources, through the joystick 6 (joystick ECU 60). In other words, the joystick 6 (joystick ECU 60) is arranged on the communication paths 9a and 9b to the remote control ECU 50 and the engine ECU 31 (between the communication paths 9a and 9b). The communication paths 9a to 9d accommodate CAN communication. In the CAN communication, a signal is transmitted and received by a differential voltage using two communication lines.

In an example of a circuit shown in FIG. 3, positive potentials and negative (ground) potentials that are equal to each other are represented by the same symbols. Specifically, potentials of about 12 V based on the potentials of the batteries 10a and 10b that are about 12 V include two lines (two types) of 12Va and 12Vb. Potentials reduced to about 5 V by each regulator include two lines (two types) of 5Va and 5Vb. Grounds connected to a minus terminal of the battery 10a or 10b include two lines (two types) of GND1 and GND2. Potentials in portions shown by the same symbols in the figure are substantially equal to each other.

The engine ECU 31 of the outboard motor 3 controls each portion of the outboard motor 3. Specifically, the engine ECU 31 (CPU 311) receives signals based on operation of the remote controller 5 and the joystick 6 from the joystick ECU 60 and controls each portion of the outboard motor 3. More specifically, the engine ECU 31 detects the rotation angle of the engine 30 on the basis of a detection result of the crank angle sensor 32. The engine ECU 31 controls the PTT 33 to adjust the trim and tilt of the outboard motor 3.

The CPU 311 is communicatively connected to the CAN I/F 313, the I/F 314, and the driver 315. The CPU 311 is connected to a potential of 5Vb and a potential of GND2.

The CAN I/F 313 transmits and receives a signal of CAN communication (control area network communication). In other words, the CAN I/F 313 receives a CAN signal from the joystick ECU 60 and transmits a signal to the CPU 311. The CAN I/F 313 receives a signal from the CPU 311 and transmits a CAN signal to the joystick ECU 60. The CAN I/F 313 is connected to a potential of 5Vb and a potential of GND2.

The I/F 314 receives a signal containing crank angle information from the crank angle sensor 32 and transmits a signal to the CPU 311. The I/F 314 is connected to a potential of 5Vb and a potential of GND2. The I/F 315 receives a signal from the CPU 311 and drives the PTT 33. The I/F 315 is connected to a potential of GND2.

The remote controller 5 is provided to operate the outboard motor 3. The remote controller 5 includes a drive-by-wire remote controller. The remote controller 5 controls the output of the outboard motor 3 (engine 30) and outputs a start signal for the engine 30. The remote control ECU 50 of the remote controller 5 controls each portion of the remote controller 5. Specifically, the remote control ECU 50 (CPU 501) outputs a control signal for operating the outboard motor 3 to the joystick ECU 60 on the basis of user's operation of the remote controller 5. More specifically, the remote control ECU 50 detects the lever position of the remote controller 5 on the basis of a detection result of the lever position sensor 51. The remote control ECU 50 acquires operated tilt and trim on the basis of user's operation of the PTT switch 52.

The CPU 501 is communicatively connected to the I/Fs 504 and 505, the CAN I/Fs 506 and 507, and the I/F 508. The CPU 501 is connected to a potential of 5Va and a potential of GND1.

The power supply circuit 503 supplies electric power to the lever position sensor 51. The power supply circuit 503 is connected to a potential of 12Va and a potential of GND1. The I/F 504 receives a signal containing lever position information from the lever position sensor 51 and transmits a signal to the CPU 501. The I/F 504 is connected to a potential of 5Va and a potential of GND1. The I/F 505 receives a signal from the PTT switch 52 and transmits a signal to the CPU 501. The I/F 505 is connected to a potential of GND1.

The CAN I/F 506 transmits and receives a signal of CAN communication (control area network communication). However, in the state of the first embodiment in which the joystick 6 is added, the CAN I/F 506 is not connected to an external device. The CAN I/F 506 is connected to a potential of 5Va and a potential of GND1. The CAN I/F 507 transmits and receives a signal of CAN communication. In other words, the CAN I/F 507 receives a CAN signal from the joystick ECU 60 and transmits a signal to the CPU 501. The CAN I/F 507 receives a signal from the CPU 501 and transmits a CAN signal to the joystick ECU 60. The CAN I/F 507 is connected to a potential of 5Va and a potential of GND1.

The I/F 508 receives a start/stop signal for the outboard motor 3 (engine 30) from the CPU 501 and transmits a signal to the joystick ECU 60. The I/F 508 is connected to a potential of 12Va and a potential of GND1.

The joystick 6 is provided to operate the outboard motor 3 and the thrusters 8a and 8b. Specifically, the joystick 6 accepts an operation of tilting a stick fore-and-aft and side-to-side and an operation of rotating the stick. In other words, the joystick 6 accepts an operation of translating the boat body 2 in a tilt direction by the operation of tilting the stick. The joystick 6 accepts an operation of turning the boat body 2 in a rotation direction by the operation of rotating the stick.

The joystick ECU 60 of the joystick 6 controls each portion of the joystick 6. Specifically, the joystick ECU 60 (CPU 601) outputs control signals to the engine ECU 31 of the outboard motor 3 and the thruster ECUs 80 of the thrusters 8a and 8b on the basis of user's operation of the joystick 6. More specifically, the joystick ECU 60 detects the tilt position of the stick on the basis of detection results of the stick position sensor X 61 and the stick position sensor Y 62. The joystick ECU 60 detects the rotation position of the stick on the basis of a detection result of the stick position sensor Z 63. The joystick ECU 60 switches between a first mode of accepting operation by the remote controller 50 and a second mode of accepting operation by the joystick 6 on the basis of operation of the mode switch 64.

According to the first embodiment, the joystick ECU 60 accepts a control signal from the remote control ECU 50 and generates control signals transmitted to the engine ECU 31 and the thruster ECUs 80 on the basis of the accepted control signal. The joystick ECU 60 generates control signals transmitted to the engine ECU 31 and the thruster ECUs 80 on the basis of operation by the joystick 6. The joystick ECU 60 accepts an input of a control signal from the engine ECU 31 and outputs the control signal to the remote control ECU 50.

According to the first embodiment, the joystick ECU 60 does not accept operation by the joystick 6 when the remote controller 5 is operated and the remote control ECU 50 outputs a control signal. In other words, the joystick ECU 60 accepts operation by the remote controller 5 in preference to operation by the joystick 6. The joystick ECU 60 switches between the first mode of accepting operation by the remote controller 5 and the second mode of accepting operation by the joystick 6 and accepts operation by the joystick 6 only when the second mode is selected.

According to the first embodiment, the joystick ECU 60 determines that the first mode is capable of being switched to the second mode when the remote controller 5 is neutral. In other words, the joystick ECU 60 detects that the remote controller 5 is at a neutral position and switches the first mode to the second mode when the second mode is selected by operation of the mode switch 64. The joystick ECU 60 outputs a control signal (stop signal) for stopping the engine 30 of the outboard motor 3 to the engine ECU 31 in the case where the power of the thrusters 8a and 8b is only used when the joystick ECU 60 switches the first mode to the second mode.

Mode switching may be determined by at least one of an engine speed, a throttle position, a boat speed, elapsed time after a neutral operation on the remote controller 5, etc. in addition to that the remote controller 5 is at the neutral position. In other words, the mode may be switched after the remote controller 5 is shifted to the neutral position and the engine speed or the boat speed is reduced.

According to the first embodiment, the joystick ECU 60 switches the second mode to the first mode when the remote controller 5 is operated in the second mode. In other words, the joystick ECU 60 stops accepting operation of the joystick 6 and switches the second mode to the first mode of accepting operation by the remote controller 5 when the remote controller 5 is operated in the forward movement direction or the reverse movement direction in the second mode in which the remote controller 5 is at a neutral position. The joystick ECU 60 outputs a control signal (start signal) for starting the engine 30 of the outboard motor 3 to the engine ECU 31 in the case where the engine 30 of the outboard motor 3 has stopped when the joystick ECU 60 switches the second mode to the first mode.

When accepting a start signal for the engine 30 from the remote controller 5, the joystick ECU 60 generates a signal on the basis of the accepted start signal from the remote controller 5 and outputs the signal to the engine ECU 31.

The joystick ECU 60 is connected to the batteries 10a and 10b such that electric power is conveyed to the joystick ECU 60. Specifically, a positive potential connected to a portion of the joystick ECU 60 including the CAN I/F 612 with respect to the photocouplers 610 and 611 is varied from the potential of the battery 10b to 12Vb by the impedance and the flowing current of an electric power line. A negative (ground) potential connected to the portion of the joystick ECU 60 including the CAN I/F 612 with respect to the photocouplers 610 and 611 is varied from the potential of the battery 10b to GND2 by the impedance and the flowing current of an electric power line. The supplied potential of 12Vb is reduced to 5Vb by the regulator 603.

A positive potential connected to a portion of the joystick ECU 60 including the CPU 601 with respect to the photocouplers 610 and 611 is varied from the potential of the battery 10a to 12Va by the impedance and the flowing current of an electric power line. A negative (ground) potential connected to the portion of the joystick ECU 60 including the CPU 601 with respect to the photocouplers 610 and 611 is varied from the potential of the battery 10a to GND1 by the impedance and the flowing current of an electric power line. The supplied potential of 12Va is reduced to 5Va by the regulator 602.

The CPU 601 is communicatively connected to the CAN I/F 604, the I/Fs 606 and 607, the driver 608, the I/F 609, the CAN I/Fs 614 and 615, the I/F 616, and the driver 617. The CPU 601 is connected to a potential of 5Va and a potential of GND1.

The power supply circuit 605 supplies electric power to the stick position sensor X 61. The power supply circuit 605 is connected to a potential of 12Va and a potential of GND1. The CAN I/F 604 transmits and receives a signal of CAN communication. In other words, the CAN I/F 604 receives a CAN signal from the indicator 7 through the hub 11 and transmits a signal to the CPU 601. The CAN I/F 604 receives a signal from the CPU 601 and transmits a CAN signal to the indicator 7. The CAN I/F 604 is connected to a potential of 5Va and a potential of GND1.

The I/F 606 receives a signal containing stick position information from the stick position sensor X 61 and transmits a signal to the CPU 601. The I/F 606 is connected to a potential of 5Va and a potential of GND1. The I/F 607 receives a signal from the mode switch 64 and transmits a signal to the CPU 601. The I/F 607 is connected to a potential of GND1.

The driver 608 receives a signal from the CPU 601 and drives an optical converter 610a of the photocoupler 610. The driver 608 is connected to a potential of 12Va and a potential of GND1. The I/F 609 receives a signal from an electrical converter 611b of the photocoupler 611 and transmits a signal to the CPU 601. The I/F 609 is connected to a potential of 5Va.

The photocouplers 610, 611, and 618 are provided on the communication path that connects the CPU 601 of the joystick ECU 60 and the engine ECU 31 to convey a signal therebetween. In other words, the communication path that connects the CPU 601 and the engine ECU 31 conveys a signal while the CPU 601 and the engine ECU 31 are electrically separated (insulated) from each other by the photocouplers 610, 611, and 618. The photocouplers 610, 611, and 618 include optical converters 610a, 611a, and 618a that convert electrical signals to optical signals and electrical converters 610b, 611b, and 618b that convert optical signals to electrical signals, respectively.

The photocoupler 610 outputs a signal from the CPU 601 to the CAN I/F 612. Specifically, the optical converter 610a converts an electrical signal output through the driver 608 from the CPU 601 to an optical signal. Then, the electrical converter 610b receives the optical signal output from the optical converter 610a, converts the optical signal to an electrical signal again, and outputs the electrical signal to the CAN I/F 612. The optical converter 610a of the photocoupler 610 connected to the CPU 601 is grounded (connected) to a potential of GND1. On the other hand, the electrical converter 610b of the photocoupler 610 connected to the engine ECU 31 is grounded (connected) to a potential of GND2.

The photocoupler 611 outputs a signal from the CAN I/F 612 to the CPU 601. Specifically, the optical converter 611a converts an electrical signal output through the driver 613 from the CAN I/F 612 to an optical signal. Then, the electrical converter 611b receives the optical signal output from the optical converter 611a, converts the optical signal to an electrical signal again, and outputs the electrical signal to the CPU 601 through the I/F 609. The electrical converter 611b of the photocoupler 611 connected to the CPU 601 is grounded (connected) to a potential of GND1. On the other hand, the optical converter 611a of the photocoupler 611 connected to the engine ECU 31 is grounded (connected) to a potential of GND2.

Comparing the structure of the boat maneuvering system 100 shown in FIG. 3 and the structure of the boat maneuvering system 100a before addition of the joystick 6 and the thrusters 8a and 8b shown in FIG. 2, in general, the battery 10a is added along with the thrusters 8a and 8b and the joystick 6, and hence mixing of power supplies or roundabout flow of electric power may be disadvantageously generated. In the boat maneuvering system 100 shown in FIG. 3, on the other hand, the photocouplers of the joystick ECU 60 disconnects electrical connection to prevent mixing of power supplies or roundabout flow of electric power.

Specifically, the remote controller 5, the thrusters 8a and 8b, and a portion of the joystick 6 are connected to the battery 10a, the outboard motor 3 and a portion of the joystick 6 are connected to the battery 10b, the battery 10a and the battery 10b are not electrically connected to each other, and in the joystick 6, a signal is delivered through the photocouplers 610, 611, and 618.

The CAN I/F 612 transmits and receives a signal of CAN communication. In other words, the CAN I/F 612 receives a CAN signal from the engine ECU 31 and transmits a signal to the CPU 601. The CAN I/F 612 receives a signal from the CPU 601 and transmits a CAN signal to the engine ECU 31. The CAN I/F 612 is connected to a potential of 5Vb and a potential of GND2.

The driver 613 receives a signal from the CAN I/F 612 and drives the optical converter 611a of the photocoupler 611. The driver 613 is connected to a potential of 12Vb and a potential of GND2. The CAN I/F 614 transmits and receives a signal of CAN communication. In other words, the CAN I/F 614 receives CAN signals from the thruster ECUs 80 and transmits a signal to the CPU 601. The CAN I/F 614 receives a signal from the CPU 601 and transmits CAN signals to the thruster ECUs 80. The CAN I/F 614 is connected to a potential of 5Va and a potential of GND1. The CAN I/F 615 transmits and receives a signal of CAN communication. In other words, the CAN I/F 615 receives a CAN signal from the remote control ECU 50 and transmits a signal to the CPU 601. The CAN I/F 615 receives a signal from the CPU 601 and transmits a CAN signal to the remote control ECU 50. The CAN I/F 615 is connected to a potential of 5Va and a potential of GND1.

The I/F 616 receives a start/stop signal for the outboard motor 3 (engine 30) from the remote control ECU 50 and transmits a signal to the CPU 601. The I/F 616 is connected to a potential of 12Va and a potential of GND1. The driver 617 receives a signal from the CPU 601 and drives the optical converter 618a of the photocoupler 618. The driver 617 is connected to a potential of 12Va and a potential of GND1.

The photocoupler 618 outputs a start/stop signal for the outboard motor 3 (engine 30) from the CPU 601 to the I/F 619. Specifically, the optical converter 618a converts an electrical signal output through the driver 617 from the CPU 601 to an optical signal. Then, the electrical converter 618b receives the optical signal output from the optical converter 618a, converts the optical signal to an electrical signal again, and outputs the electrical signal to the I/F 619. The optical converter 618a of the photocoupler 618 connected to the CPU 601 is grounded (connected) to a potential of GND1. On the other hand, the electrical converter 618b of the photocoupler 618 connected to the engine ECU 31 is grounded (connected) to a potential of GND2.

The I/F 619 receives a signal from the electrical converter 618b of the photocoupler 618 and transmits a signal to the engine ECU 31. The I/F 619 is connected to a potential of 12Vb and a potential of GND2.

The indicator 7 is connected to the joystick 6 (joystick ECU 60) through the hub 11. The indicator 7 displays the states of the remote controller 5 and the joystick 6, the states of the outboard motor 3 and the thrusters 8a and 8b, an operation screen of the joystick 6, etc.

The thruster 8a (8b) is mounted on a bow (stern) of the boat to be rotatable along a rotation axis in a vertical direction. In other words, the thruster 8a (8b) allows propulsion power to act in any directions including a fore-and-aft direction and a transverse direction with respect to the boat body 2. The thrusters 8a and 8b are used in the second mode. For example, the thrusters 8a and 8b are used to bring the boat 1 alongside a pier or to move the boat 1 away from a pier.

The thruster ECU 80 of the thruster 8a (8b) controls each portion of the thruster 8a (8b). Specifically, the thruster ECU 80 (CPU 801) receives signals based on operation of the remote controller 5 and the joystick 6 from the joystick ECU 60 and controls each portion of the thruster 8a (8b). More specifically, the thruster ECU 80 controls driving of the propulsion motor 81. The thruster ECU 80 detects the rotation angle of the motor on the basis of a detection result of the rotation angle sensor 82. The thruster ECU 80 controls the steering motor 83 to adjust the rudder angle (direction) of the thruster 8a (8b). The thruster ECU 80 detects the rudder angle of the thruster 8a (8b) on the basis of a detection result of the rudder angle sensor 84.

The thruster ECU 80 is connected to the battery 10a such that electric power is conveyed to the thruster ECU 80. The potential of a plus terminal connected to the thruster ECU 80 is varied from the potential of the battery 10a to 12Va by the impedance and the flowing current of an electric power line. The potential of a minus terminal (ground) connected to the thruster ECU 80 is varied from the potential of the battery 10a to GND1 by the impedance and the flowing current of an electric power line. The supplied potential of 12Va is reduced to 5Va by the regulator 802.

The CPU 801 is communicatively connected to the CAN I/F 803, the driver 804, and the I/F 805. The CPU 801 is connected to a potential of 5Va and a potential of GND1.

The CAN I/F 803 transmits and receives a signal of CAN communication. In other words, the CAN I/F 803 receives a CAN signal from the joystick ECU 60 and transmits a signal to the CPU 801. The CAN I/F 803 receives a signal from the CPU 801 and transmits a CAN signal to the joystick ECU 60. The CAN I/F 803 is connected to a potential of 5Va and a potential of GND1.

The driver 804 receives a signal from the CPU 801 and drives the propulsion motor 81. The driver 804 is connected to a potential of 12Va, a potential of 5Va, and a potential of GND1. The I/F 805 receives a signal containing rotation angle information from the rotation angle sensor 82 and transmits a signal to the CPU 801. The I/F 805 is connected to a potential of 5Va and a potential of GND1.

The batteries 10a and 10b are provided on the boat body 2 or the outboard motor 3. The battery 10a supplies electric power to the remote controller 5, the joystick 6, and the thrusters 8a and 8b. The battery 10b supplies electric power to the outboard motor 3 and the joystick 6.

Figure 4:
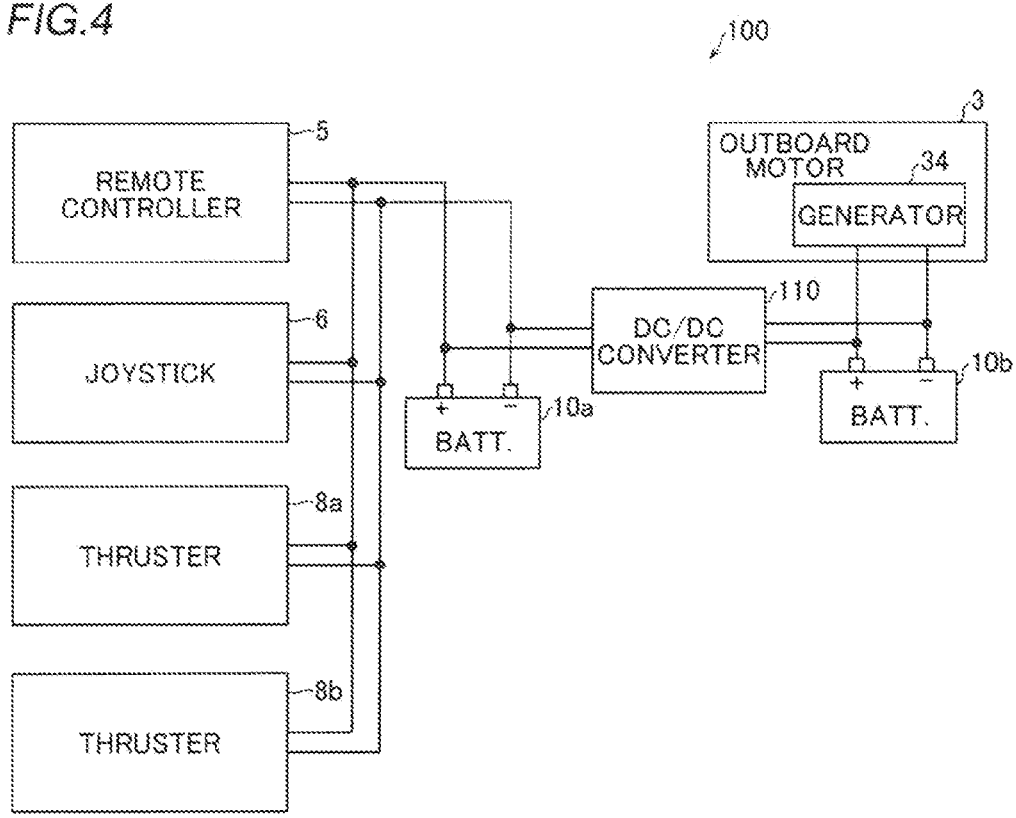
FIG. 4 is a diagram for illustrating power supply connections in the boat maneuvering system according to the first embodiment of the present invention.

As shown in FIG. 4, the battery 10b is charged by a generator 34 of the outboard motor 3. In other words, the generator 34 is driven by the engine 30 when the engine 30 of the outboard motor 3 is driven and generates electric power. The battery 10b is connected to the battery 10a by an isolation DC/DC converter 110. In other words, the battery 10b is electrically isolated from the battery 10a, and electric power is supplied from the generator 34 to the battery 10b while flow of electric current between a circuit connected to the battery 10*a* and a circuit connected to the battery 10*b* is prevented, whereby the battery 10*b* is charged. A method in which direct current from the battery of the outboard motor 3 is converted into alternating current and thereafter converted into direct current again may be employed. Preferably, a GND line is not connected. In the case where the GND line is connected, wire connection that is free from flow of electric current between the circuit connected to the battery 10*a* and the circuit connected to the battery 10*b* may be employed.

According to the aforementioned first embodiment, the following effects are obtained.

According to the first embodiment, as hereinabove described, the joystick ECU 60 that accepts the control signal from the remote control ECU 50 and an operation instruction input from the joystick 6 and generates the control signal output to the engine ECU 31 and the control signals output to the thrusters 8*a* and 8*b* are provided on the communication paths 9*a* and 9*b* between the remote control ECU 50 and the engine ECU 31. Thus, even when the thrusters 8*a* and 8*b* and the joystick 6 are newly added to the existing boat maneuvering system 100*a*, the joystick ECU 60 relays the control signal for operation of the outboard motor 3 by the existing remote controller 5 and enables the operation of the outboard motor 3 by the existing remote controller 5. The joystick ECU 60 generates the control signals for operation of the thrusters 8*a* and 8*b* and the outboard motor 3 by the joystick 6 and enables the operation of the thrusters 8*a* and 8*b* and the outboard motor 3 by the joystick 6. Consequently, a new operating device and a new power source are easily added to the existing boat maneuvering system 100*a*.

According to the first embodiment, as hereinabove described, the joystick ECU 60 generates the control signal output to the engine ECU 31 and the thrusters 8*a* and 8*b* on the basis of operation by the joystick 6. Thus, the joystick 6 is easily added to the existing boat maneuvering system 100*a* to maneuver the boat.

According to the first embodiment, as hereinabove described, the joystick ECU 60 accepts the input of the control signal from the engine ECU 31 and outputs the control signal to the remote control ECU 50. Thus, even when an operating device and a power source are newly added to the existing boat maneuvering system 100*a*, the control signal containing information such as the state of the outboard motor 3 is reliably transmitted from the engine ECU 31 to the remote control ECU 50 through the joystick ECU 60.

According to the first embodiment, as hereinabove described, the joystick ECU 60 does not accept operation by the joystick 6 when the remote controller 5 is operated and the control signal is output from the remote control ECU 50. Thus, an operation on the remote controller 5 is prioritized, and the control signal is transmitted to the outboard motor 3, whereby crosstalk between the control signal based on an operation on the remote controller 5 and the control signal based on an operation on the joystick 6 is prevented.

According to the first embodiment, as hereinabove described, the joystick ECU 60 switches between the first mode of accepting operation by the remote controller 5 and the second mode of accepting operation by the joystick 6 and accepts the operation by the joystick 6 only when the second mode is selected. Thus, boat maneuvering by the joystick 6 is prevented in the first mode.

According to the first embodiment, as hereinabove described, the joystick ECU 60 is capable of switching the first mode to the second mode when the remote controller 5 is neutral. Thus, the first mode is capable of being switched to the second mode when the remote controller 5 is neutral and the propulsion power of the outboard motor 3 is substantially zero, and hence action of an excessive change in the propulsion power on the boat 1 is significantly reduced or prevented when the mode is switched.

According to the first embodiment, as hereinabove described, the joystick ECU 60 switches the second mode to the first mode when the remote controller 5 is operated in the second mode. Thus, in the case where an operation of sailing the boat is performed in the first mode after an operation of moving the boat away from a pier is performed in the second mode, for example, the second mode is automatically switched to the first mode by performing operation by the remote controller 5 after the boat is moved away from a pier by operation in the second mode, and hence an operation of moving the boat away from a pier is promptly shifted to an operation of sailing the boat.

According to the first embodiment, as hereinabove described, the joystick ECU 60 outputs the stop signal for the outboard motor 3 to the engine ECU 31 when the first mode is switched to the second mode. Thus, the propulsion power of the outboard motor 3 is reduced to zero when the first mode is shifted to the second mode, and hence action of an excessive change in the propulsion power on the boat is significantly reduced or prevented when the mode is switched.

According to the first embodiment, as hereinabove described, the joystick ECU 60 outputs the start signal for the outboard motor 3 to the engine ECU 31 when the second mode is switched to the first mode. Thus, boat maneuvering by operating the thrusters 8*a* and 8*b* in the second mode is easily shifted to boat maneuvering by operating the outboard motor 3 in the first mode.

Second Embodiment

A second embodiment of the present invention is now described with reference to FIGS. 5 to 7. In this second embodiment, no thruster is provided, but two outboard motors are provided, unlike the aforementioned first embodiment in which the thrusters are provided. Portions similar to those of the boat maneuvering system 100 according to the first embodiment are denoted by the same reference numerals.

Figure 5:
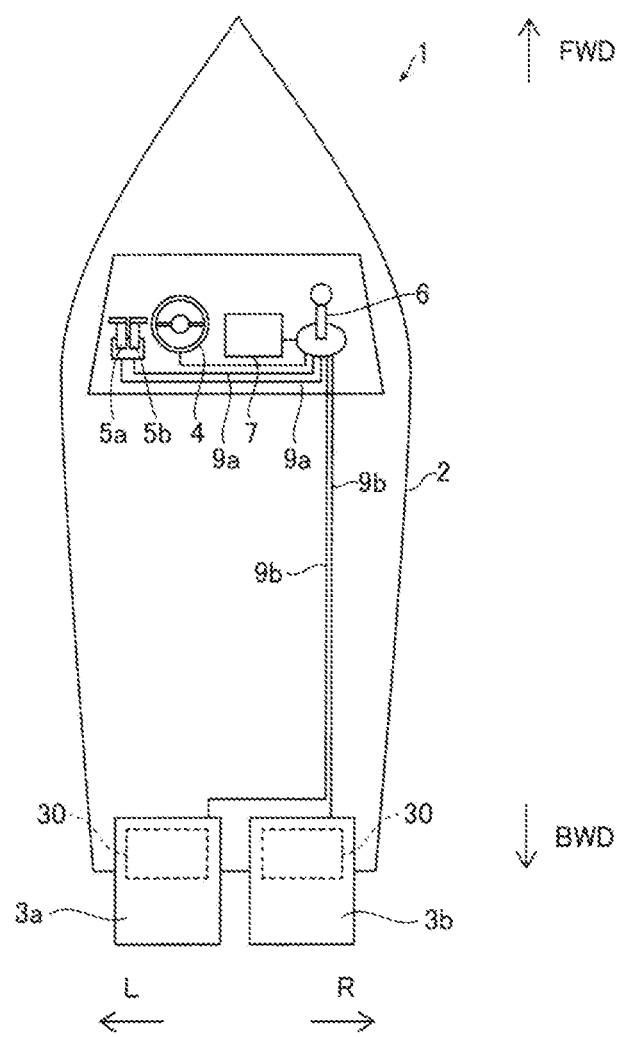
FIG. 5 is a diagram showing a boat including a boat maneuvering system according to a second embodiment of the present invention.

According to the second embodiment, a boat maneuvering system 200 (see FIG. 7) is provided to maneuver a boat 1 shown in FIG. 5. The boat 1 is provided with a boat body 2, two outboard motors 3*a* and 3*b* mounted on a rear portion of the boat body 2, configured to propel the boat body 2, a steering wheel 4 configured to steer the boat body 2 (turn the outboard motors 3*a* and 3*b*), remote controllers 5*a* and 5*b* configured to operate the shift and output (throttle position) of the outboard motors 3*a* and 3*b*, a joystick 6 configured to steer the boat body 2, an indicator 7, and communication paths 9*a* and 9*b* that communicatively connect each device, as shown in FIG. 5. The boat 1 includes batteries 10*a*, 10*b*, and 10*c*, as shown in FIG. 7. The outboard motors 3*a* and 3*b* are examples of the "first power source" in the present invention, and the steering wheel 4 and the remote controller 5 are examples of the "first operating device" in the present invention. The joystick 6 is an example of the "second operating device" in the present invention.

A boat maneuvering system 200*a* before addition of the joystick 6 is now described with reference to FIG. 6.

Figure 6:
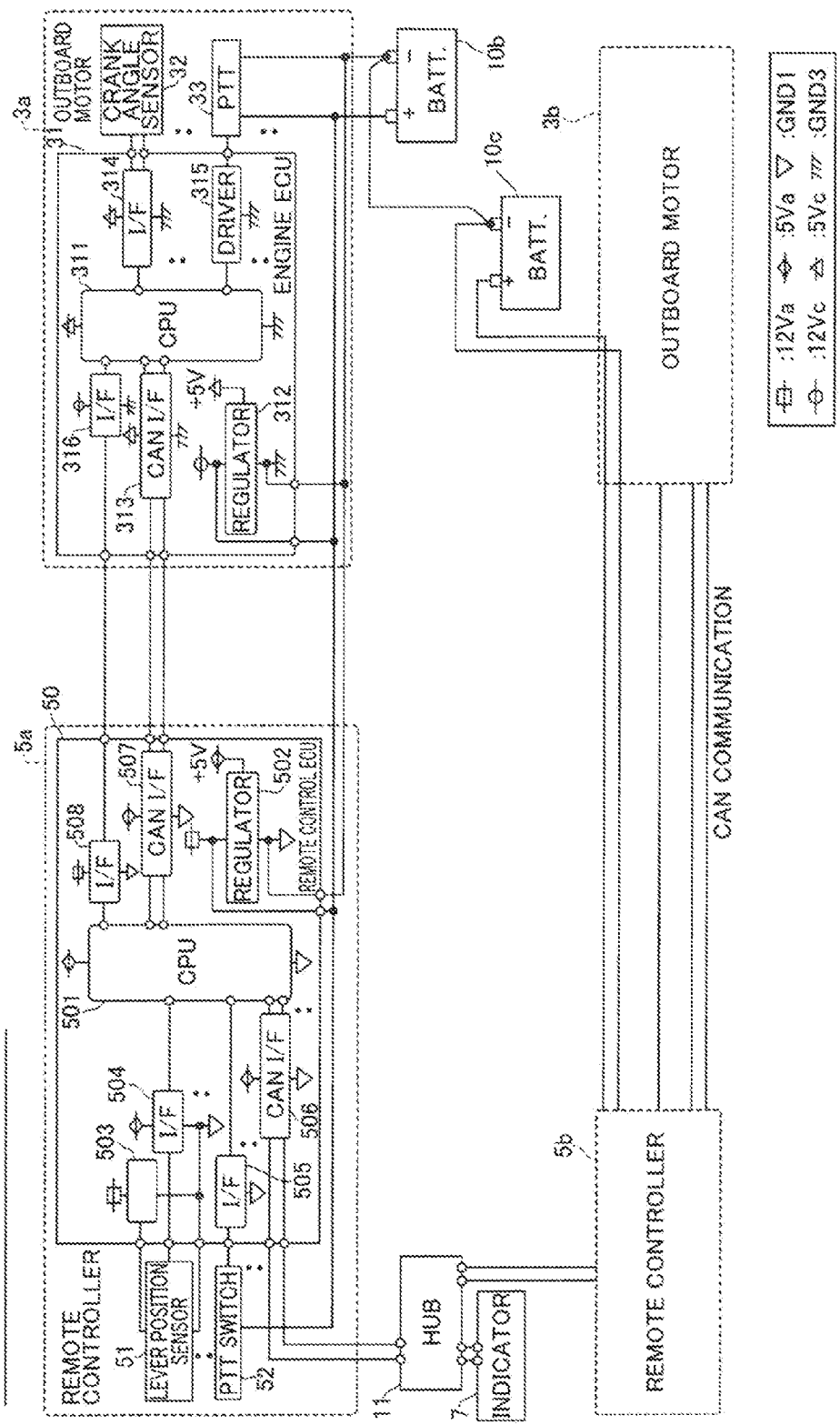
FIG. 6 is a circuit diagram schematically showing the boat maneuvering system according to the second embodiment of the present invention before addition of a joystick.

As shown in FIG. 6, in the boat maneuvering system 200a, the remote controller 5a (5b) and the outboard motor 3a (3b) are directly communicatively connected to each other through CAN communication before addition of the joystick 6. Specifically, the remote controller 5a (5b) (remote control ECU 50) and the outboard motor 3a (3b) (engine ECU 31) are connected to each other by communication lines. In other words, a CPU 501 of the remote controller 5a (5b) and a CPU 311 of the outboard motor 3a (3b) are communicatively connected to each other through CAN I/Fs 507 and 313.

Electric power is supplied to the remote controller 5a from the battery 10b, similarly to the outboard motor 3a. Electric power is supplied to the remote controller 5b from the battery 10c, similarly to the outboard motor 3b. The remote controller 5a (5b) (remote control ECU 50) and the indicator 7 are connected to each other by communication lines. In other words, the CPU 501 of the remote controller 5a (5b) and the indicator 7 are communicatively connected to each other through a CAN I/F 506 and a hub 11.

The boat maneuvering system 200 after addition of the joystick 6 is now described with reference to FIG. 7.

The outboard motors 3a and 3b have the same structure as the outboard motor 3 according to the first embodiment. In other words, the outboard motor 3a (3b) may include the engine ECU (electronic control unit) 31, a crank angle sensor 32, and a PTT (power trim tilt) 33 as the control structure, as shown in FIG. 7. The engine ECU 31 is an example of the "first controller" in the present invention. The engine ECU 31 may also be disposed outside of the outboard motor 3.

The remote controllers 5a and 5b have the same structure as the remote controller 5 according to the first embodiment. In other words, the remote controller 5a (5b) may include the remote control ECU (electronic control unit) 50, a lever position sensor 51, and a PTT switch 52 as the control structure, as shown in FIG. 7. The remote control ECU 50 is an example of the "second controller" in the present invention. The remote control ECU 50 may also be disposed outside of the remote controller 5.

Figure 7:
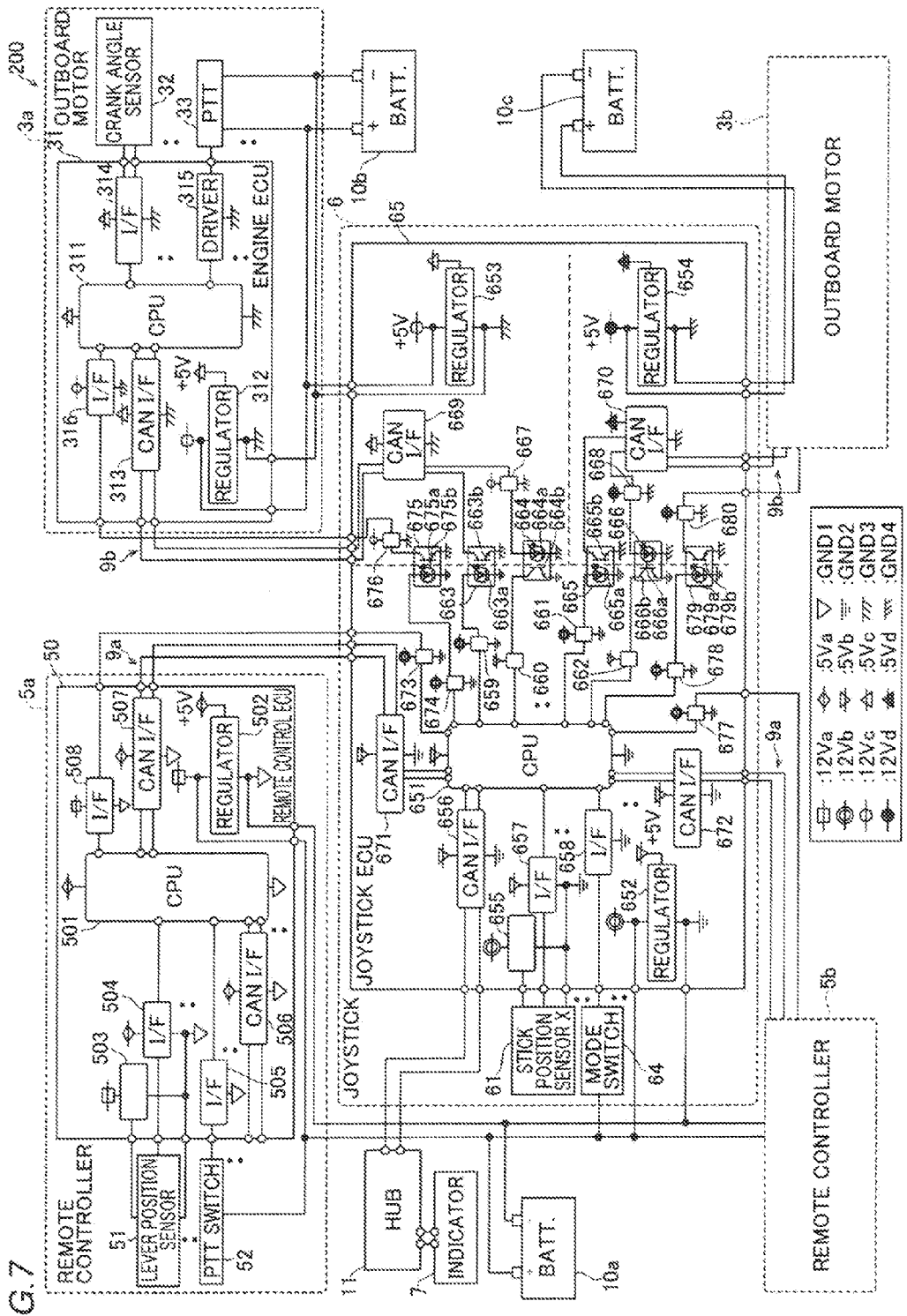
FIG. 7 is a circuit diagram schematically showing the boat maneuvering system according to the second embodiment of the present invention.

The joystick 6 may include a stick position sensor X 61, a stick position sensor Y (not shown), a stick position sensor Z (not shown), a mode switch 64, and a joystick ECU 65 as the control structure, as shown in FIG. 7. The joystick ECU 65 is an example of the "third controller" in the present invention. The joystick ECU 60 may also be disposed outside of the joystick 6.

The joystick ECU 65 includes a CPU 651, regulators 652, 653, and 654, a power supply circuit 655, a CAN I/F 656, I/Fs 657 and 658, a driver 659, an I/F 660, a driver 661, an I/F 662, photocouplers 663, 664, 665, and 666, drivers 667 and 668, CAN I/Fs 669, 670, 671, and 672, an I/F 673, a driver 674, a photocoupler 675, an I/F 676, an I/F 677, a driver 678, a photocoupler 679, and an I/F 680.

The outboard motors 3a and 3b, the remote controllers 5a and 5b, and the joystick 6 are communicatively connected to each other by CAN communication through the communication paths 9a and 9b. Specifically, the remote controllers 5a and 5b (remote control ECUs 50) are connected to the joystick 6 (joystick ECU 65) through the communication paths 9a. The outboard motors 3a and 3b (engine ECUs 31) are connected to the joystick 6 (joystick ECU 65) through the communication paths 9b. In other words, the remote controllers 5a and 5b, which are operating devices, are communicatively connected to the outboard motors 3a and 3b, which are power sources, through the joystick 6 (joystick ECU 65). In other words, the joystick 6 (joystick ECU 65) is arranged on the communication paths 9a and 9b to the remote control ECUs 50 and the engine ECUs 31 (between the communication paths 9a and 9b). The communication paths 9a and 9b accommodate CAN communication. In the CAN communication, a signal is transmitted and received by a differential voltage using two communication lines.

In an example of a circuit shown in FIG. 7, positive potentials and negative (ground) potentials that are equal to each other are represented by the same symbols. Specifically, potentials of about 12 V based on the potential of the battery 10a, 10b, or 10c that is about 12 V include four lines (four types) of 12Va, 12Vb, 12Vc, and 12Vd. Potentials reduced to about 5 V by each regulator include four lines (four types) of 5Va, 5Vb, 5Vc, and 5Vd. Grounds connected to a minus terminal of the battery 10a, 10b, or 10c include four lines (four types) of GND1, GND2, GND3, and GND4. Potentials in portions shown by the same symbols in the figure are substantially equal to each other.

The joystick 6 is provided to operate the outboard motors 3a and 3b. Specifically, the joystick 6 accepts an operation of tilting a stick fore-and-aft and side-to-side and an operation of rotating the stick. In other words, the joystick 6 accepts an operation of translating the boat body 2 in a tilt direction by the operation of tilting the stick. The joystick 6 accepts an operation of turning the boat body 2 in a rotation direction by the operation of rotating the stick.

According to the second embodiment, the joystick ECU 65 accepts control signals from the remote control ECUs 50 of the remote controller 5a and 5b and generates control signals transmitted to the engine ECUs 31 of the outboard motors 3a and 3b on the basis of the accepted control signals. The joystick ECU 65 generates control signals transmitted to the engine ECUs 31 of the outboard motors 3a and 3b on the basis of operation by the joystick 6. The joystick ECU 65 accepts inputs of control signals from the engine ECUs 31 and outputs the control signals to the remote control ECUs 50.

According to the second embodiment, the joystick ECU 65 is capable of outputting different control signals to the two outboard motors 3a and 3b in a second mode of accepting operation by the joystick 6. In other words, the joystick ECU 65 translates the boat body 2 fore-and-aft and side-to-side and turns the boat body 2 by adjusting the turning angles and the outputs of the two outboard motors 3a and 3b on the basis of operation by the joystick 6.

The joystick ECU 65 is connected to the batteries 10a, 10b, and 10c such that electric power is conveyed to the joystick ECU 65. Specifically, a positive potential connected to a portion of the joystick ECU 65 including the CAN I/F 669 with respect to the photocouplers 663 and 664 is varied from the potential of the battery 10b to 12Vc by the impedance and the flowing current of an electric power line. The supplied potential of 12Vc is reduced to 5Vc by the regulator 653.

A positive potential connected to a portion of the joystick ECU 65 including the CAN I/F 670 with respect to the photocouplers 665 and 666 is varied from the potential of the battery 10c to 12Vd by the impedance and the flowing current of an electric power line. The supplied potential of 12Vd is reduced to 5Vd by the regulator 654.

A positive potential connected to a portion of the joystick ECU 65 including the CPU 651 with respect to the photocouplers 663 to 666 is varied from the potential of the battery 10a to 12Vb by the impedance and the flowing current of an electric power line. The supplied potential of 12Vb is reduced to 5Vb by the regulator 652.

The CPU 651 is communicatively connected to the CAN I/F 656, the I/Fs 657 and 658, the driver 659, the I/F 660, the driver 661, the I/F 662, the CAN I/Fs 671 and 672, the I/F 673, the driver 674, the I/F 677, and the driver 678. The CPU 651 is connected to a potential of 5Vb and a potential of GND2.

The power supply circuit 655 supplies electric power to the stick position sensor X 61. The power supply circuit 655 is connected to a potential of 12Vb and a potential of GND2. The CAN I/F 656 transmits and receives a signal of CAN communication. In other words, the CAN I/F 656 receives a CAN signal from the indicator 7 through the hub 11 and transmits a signal to the CPU 651. The CAN I/F 656 receives a signal from the CPU 651 and transmits a CAN signal to the indicator 7. The CAN I/F 656 is connected to a potential of 5Vb and a potential of GND2.

The I/F 657 receives a signal containing stick position information from the stick position sensor X 61 and transmits a signal to the CPU 651. The I/F 657 is connected to a potential of 5Vb and a potential of GND2. The I/F 658 receives a signal from the mode switch 64 and transmits a signal to the CPU 651. The I/F 658 is connected to a potential of GND2.

The driver 659 receives a signal from the CPU 651 and drives an optical converter 663a of the photocoupler 663. The driver 659 is connected to a potential of 12Vb and a potential of GND2. The I/F 660 receives a signal from an electrical converter 664b of the photocoupler 664 and transmits a signal to the CPU 651. The I/F 660 is connected to a potential of 5Vb.

The driver 661 receives a signal from the CPU 651 and drives an optical converter 665a of the photocoupler 665. The driver 661 is connected to a potential of 12Vb and a potential of GND2. The I/F 662 receives a signal from an electrical converter 666b of the photocoupler 666 and transmits a signal to the CPU 651. The I/F 662 is connected to a potential of 5Vb.

The photocouplers 663, 664, 665, 666, 675, and 679 are provided on the communication paths that connect the CPU 651 of the joystick ECU 65 and the engine ECUs 31 to convey signals therebetween. In other words, the communication paths that connect the CPU 651 and the engine ECUs 31 convey signals while the CPU 651 and the engine ECUs 31 are electrically separated (insulated) from each other by the photocouplers 663, 664, 665, 666, 675, and 679. The photocouplers 663, 664, 665, 666, 675, and 679 include optical converters 663a, 664a, 665a, 666a, 675a, and 679a that convert electrical signals to optical signals and electrical converters 663b, 664b, 665b, 666b, 675b, and 679b that convert optical signals to electrical signals, respectively.

The photocoupler 663 outputs a signal from the CPU 651 to the CAN I/F 669. Specifically, the optical converter 663a converts an electrical signal output through the driver 659 from the CPU 651 to an optical signal. Then, the electrical converter 663b receives the optical signal output from the optical converter 663a, converts the optical signal to an electrical signal again, and outputs the electrical signal to the CAN I/F 669. The optical converter 663a of the photocoupler 663 connected to the CPU 651 is grounded (connected) to a potential of GND2. On the other hand, the electrical converter 663b of the photocoupler 663 connected to the engine ECU 31 of the outboard motor 3a is grounded (connected) to a potential of GND3.

The photocoupler 664 outputs a signal from the CAN I/F 669 to the CPU 651. Specifically, the optical converter 664a converts an electrical signal output through the driver 667 from the CAN I/F 669 to an optical signal. Then, the electrical converter 664b receives the optical signal output from the optical converter 664a, converts the optical signal to an electrical signal again, and outputs the electrical signal to the CPU 651 through the I/F 660. The electrical converter 664b of the photocoupler 664 connected to the CPU 651 is grounded (connected) to a potential of GND2. On the other hand, the optical converter 664a of the photocoupler 664 connected to the engine ECU 31 of the outboard motor 3a is grounded (connected) to a potential of GND3.

The photocoupler 665 outputs a signal from the CPU 651 to the CAN I/F 670. Specifically, the optical converter 665a converts an electrical signal output through the driver 661 from the CPU 651 to an optical signal. Then, the electrical converter 665b receives the optical signal output from the optical converter 665a, converts the optical signal to an electrical signal again, and outputs the electrical signal to the CAN I/F 670. The optical converter 665a of the photocoupler 665 connected to the CPU 651 is grounded (connected) to a potential of GND2. On the other hand, the electrical converter 665b of the photocoupler 665 connected to the engine ECU 31 of the outboard motor 3b is grounded (connected) to a potential of GND4.

The photocoupler 666 outputs a signal from the CAN I/F 670 to the CPU 651. Specifically, the optical converter 666a converts an electrical signal output through the driver 668 from the CAN I/F 670 to an optical signal. Then, the electrical converter 666b receives the optical signal output from the optical converter 666a, converts the optical signal to an electrical signal again, and outputs the electrical signal to the CPU 651 through the I/F 662. The electrical converter 666b of the photocoupler 666 connected to the CPU 651 is grounded (connected) to a potential of GND2. On the other hand, the optical converter 666a of the photocoupler 666 connected to the engine ECU 31 of the outboard motor 3b is grounded (connected) to a potential of GND4.

Comparing the structure of the boat maneuvering system 200 shown in FIG. 7 and the structure of the boat maneuvering system 200a before addition of the joystick 6 shown in FIG. 6, in the boat maneuvering system 200a shown in FIG. 6, the battery 10a is added along with the joystick 6, and hence mixing of power supplies or roundabout flow of electric power may be disadvantageously generated. In the boat maneuvering system 200 shown in FIG. 7, on the other hand, the photocouplers of the joystick ECU 65 disconnects electrical connection to prevent mixing of power supplies or roundabout flow of electric power.

Specifically, the remote controller 5 and a portion of the joystick 6 are connected to the battery 10a, and the outboard motors 3a and 3b and a portion of the joystick 6 are connected to the batteries 10b and 10c, the battery 10a and the battery 10b or 10c are not electrically connected to each other, and in the joystick 6, a signal is delivered through the photocouplers 663, 664, 665, 666, 675, and 679.

The driver 667 receives a signal from the CAN I/F 669 and drives the optical converter 664a of the photocoupler 664. The driver 667 is connected to a potential of 12Vc and a potential of GND3. The driver 668 receives a signal from the CAN I/F 670 and drives the optical converter 666a of the photocoupler 666. The driver 668 is connected to a potential of 12Vd and a potential of GND4.

The CAN I/F 669 transmits and receives a signal of CAN communication. In other words, the CAN I/F 669 receives a CAN signal from the engine ECU 31 of the outboard motor 3a and transmits a signal to the CPU 651. The CAN I/F 669 receives a signal from the CPU 651 and transmits a CAN signal to the engine ECU 31 of the outboard motor 3*a*. The CAN I/F 669 is connected to a potential of 5Vc and a potential of GND3.

The CAN I/F 670 transmits and receives a signal of CAN communication. In other words, the CAN I/F 670 receives a CAN signal from the engine ECU 31 of the outboard motor 3*b* and transmits a signal to the CPU 651. The CAN I/F 670 receives a signal from the CPU 651 and transmits a CAN signal to the engine ECU 31 of the outboard motor 3*b*. The CAN I/F 670 is connected to a potential of 5Vd and a potential of GND4.

The CAN I/F 671 transmits and receives a signal of CAN communication. In other words, the CAN I/F 671 receives a CAN signal from the remote control ECU 50 of the remote controller 5*a* and transmits a signal to the CPU 651. The CAN I/F 671 receives a signal from the CPU 651 and transmits a CAN signal to the remote control ECU 50 of the remote controller 5*a*. The CAN I/F 671 is connected to a potential of 5Vb and a potential of GND2.

The CAN I/F 672 transmits and receives a signal of CAN communication. In other words, the CAN I/F 672 receives a CAN signal from the remote control ECU 50 of the remote controller 5*b* and transmits a signal to the CPU 651. The CAN I/F 672 receives a signal from the CPU 651 and transmits a CAN signal to the remote control ECU 50 of the remote controller 5*b*. The CAN I/F 672 is connected to a potential of 5Vb and a potential of GND2.

The I/F 673 receives a start/stop signal for the outboard motor 3*a* (engine 30) from the remote control ECU 50 of the remote controller 5*a* and transmits a signal to the CPU 651. The I/F 673 is connected to a potential of 12Vb and a potential of GND2. The driver 674 receives a signal from the CPU 651 and drives the optical converter 675*a* of the photocoupler 675. The driver 674 is connected to a potential of 12Vb and a potential of GND2.

The photocoupler 675 outputs a start/stop signal for the outboard motor 3*a* (engine 30) from the CPU 651 to the I/F 676. Specifically, the optical converter 675*a* converts an electrical signal output through the driver 674 from the CPU 651 to an optical signal. Then, the electrical converter 675*b* receives the optical signal output from the optical converter 675*a*, converts the optical signal to an electrical signal again, and outputs the electrical signal to the I/F 676. The optical converter 675*a* of the photocoupler 675 connected to the CPU 651 is grounded (connected) to a potential of GND2. On the other hand, the electrical converter 675*b* of the photocoupler 675 connected to the engine ECU 31 of the outboard motor 3*a* is grounded (connected) to a potential of GND3.

The I/F 676 receives a signal from the electrical converter 675*b* of the photocoupler 675 and transmits a signal to the engine ECU 31 of the outboard motor 3*a*. The I/F 676 is connected to a potential of 12Vc and a potential of GND3.

The I/F 677 receives a start/stop signal for the outboard motor 3*b* (engine 30) from the remote control ECU 50 of the remote controller 5*b* and transmits a signal to the CPU 651. The I/F 677 is connected to a potential of 12Vb and a potential of GND2. The driver 678 receives a signal from the CPU 651 and drives the optical converter 679*a* of the photocoupler 679. The driver 678 is connected to a potential of 12Vb and a potential of GND2.

The photocoupler 679 outputs a start/stop signal for the outboard motor 3*b* (engine 30) from the CPU 651 to the I/F 680. Specifically, the optical converter 679*a* converts an electrical signal output through the driver 678 from the CPU 651 to an optical signal. Then, the electrical converter 679*b* receives the optical signal output from the optical converter 679*a*, converts the optical signal to an electrical signal again, and outputs the electrical signal to the I/F 680. The optical converter 679*a* of the photocoupler 679 connected to the CPU 651 is grounded (connected) to a potential of GND2. On the other hand, the electrical converter 679*b* of the photocoupler 679 connected to the engine ECU 31 of the outboard motor 3*b* is grounded (connected) to a potential of GND4.

The I/F 680 receives a signal from the electrical converter 679*b* of the photocoupler 679 and transmits a signal to the engine ECU 31 of the outboard motor 3*b*. The I/F 680 is connected to a potential of 12Vd and a potential of GND4.

The batteries 10*a*, 10*b*, and 10*c* are provided on the boat body 2, the outboard motor 3*a*, or the outboard motor 3*b*. The battery 10*a* supplies electric power to the remote controllers 5*a* and 5*b* and the joystick 6. The battery 10*b* supplies electric power to the outboard motor 3*a* and the joystick 6. The battery 10*c* supplies electric power to the outboard motor 3*b* and the joystick 6.

The remaining structure of the boat maneuvering system 200 according to the second embodiment is similar to that of the boat maneuvering system 100 according to the aforementioned first embodiment.

According to the second embodiment, the following effects are obtained.

According to the second embodiment, as hereinabove described, the joystick ECU 65 that accepts the control signals from the remote control ECUs 50 and an operation instruction input from the joystick 6 and generates the control signals output to the engine ECUs 31 is provided on the communication paths 9*a* and 9*b* between the engine ECUs 31 and the remote control ECUs 50. Thus, even when the joystick 6 is newly added to the existing boat maneuvering system 200*a*, the joystick ECU 65 relays the control signals for operation of the outboard motors 3*a* and 3*b* by the existing remote controllers 5*a* and 5*b* and enables the operation of the outboard motors 3*a* and 3*b* by the existing remote controllers 5*a* and 5*b*. The joystick ECU 65 generates the control signals for operation of the outboard motors 3*a* and 3*b* by the joystick 6 and enables the operation of the outboard motors 3*a* and 3*b* by the joystick 6. Consequently, a new operating device is easily added to the existing boat maneuvering system 200*a*.

The remaining effects of the second embodiment are similar to those of the aforementioned first embodiment.

Third Embodiment

A third embodiment of the present invention is now described with reference to FIGS. 8 and 9. In this third embodiment, no joystick is provided, unlike the aforementioned first and second embodiments in which the joystick is provided. Portions similar to those of the boat maneuvering system 100 according to the first embodiment are denoted by the same reference numerals.

Figure 8:
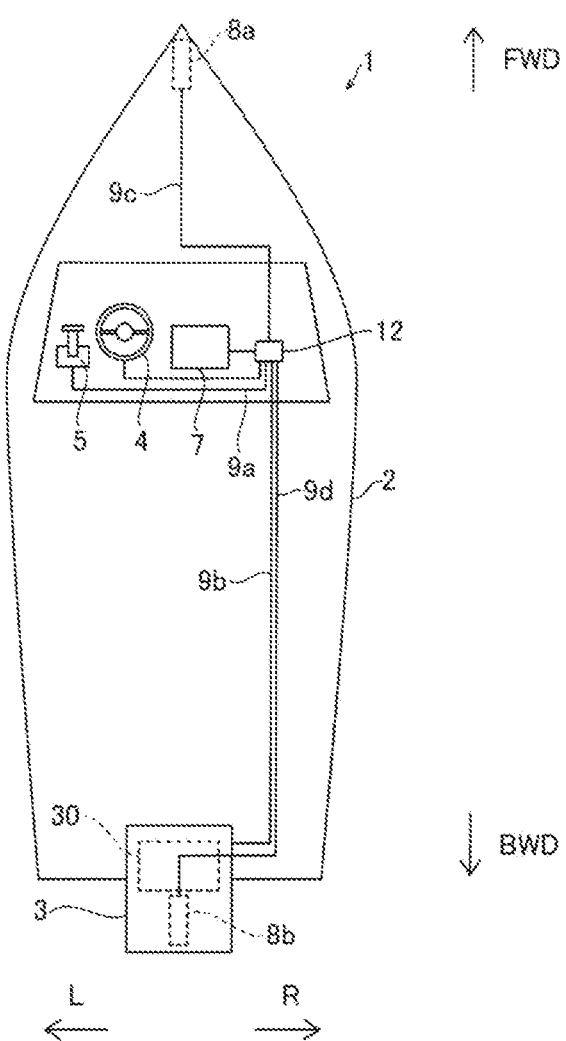
FIG. 8 is a diagram showing a boat including a boat maneuvering system according to a third embodiment of the present invention.
Figure 9:
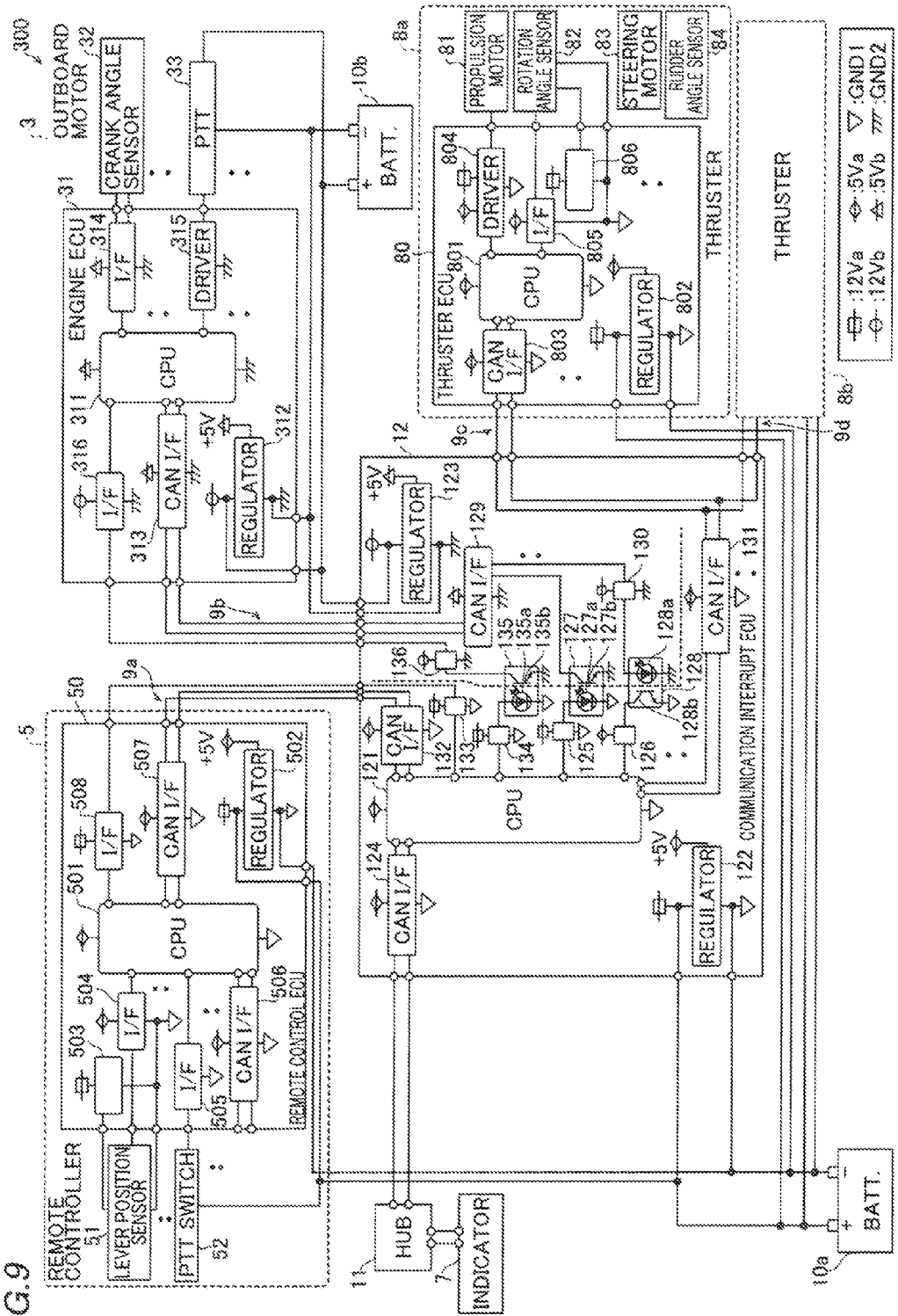
FIG. 9 is a circuit diagram schematically showing the boat maneuvering system according to the third embodiment of the present invention.

According to the third embodiment, a boat maneuvering system 300 (see FIG. 9) is provided to maneuver a boat 1 shown in FIG. 8. The boat 1 is provided with a boat body 2, an outboard motor 3 mounted on a rear portion of the boat body 2, configured to propel the boat body 2, a steering wheel 4 configured to steer the boat body 2 (turn the outboard motor 3), a remote controller 5 configured to operate the shift and output (throttle position) of the outboard motor 3, an indicator 7, thrusters 8*a* and 8*b* provided on front and rear portions (a bow and a stern) of the boat body 2, respectively, communication paths 9*a*, 9*b*, 9*c*, and 9*d* that communicatively connect each device, and a communication interrupt ECU 12, as shown in FIG. 8. The boat 1 includes batteries 10*a* and 10*b*, as shown in FIG. 9. The outboard motor 3 is an example of the "first power source" in the present invention, and the steering wheel 4 and the remote controller 5 are examples of the "first operating device" in the present invention. The thrusters 8*a* and 8*b* are examples of the "second power source" in the present invention.

A boat maneuvering system 100*a* before addition of the thrusters 8*a* and 8*b* and the communication interrupt ECU 12 has the same structure as that in FIG. 2 according to the first embodiment.

According to the third embodiment, the outboard motor 3, the remote controller 5, the thrusters 8*a* and 8*b*, and the communication interrupt ECU 12 are communicatively connected to each other through CAN communication by the communication paths 9*a* to 9*d*. Specifically, the remote controller 5 (remote control ECU 50) is connected to the communication interrupt ECU 12 by the communication path 9*a*. The outboard motor 3 (engine ECU 31) is connected to the communication interrupt ECU 12 by the communication path 9*b*. The thrusters 8*a* and 8*b* (thruster ECUs 80) are connected to the communication interrupt ECU 12 by the communication paths 9*c* and 9*d*, respectively. In other words, the remote controller 5, which is an operating device, is communicatively connected to the outboard motor 3 and the thrusters 8*a* and 8*b*, which are power sources, through the communication interrupt ECU 12. In other words, the communication interrupt ECU 12 is arranged on the communication paths 9*a* and 9*b* to the remote control ECU 50 and the engine ECU 31 (between the communication paths 9*a* and 9*b*). The communication paths 9*a* to 9*d* accommodate CAN communication. In the CAN communication, a signal is transmitted and received by a differential voltage using two communication lines.

The communication interrupt ECU 12 includes a CPU 121, regulators 122 and 123, a CAN I/F 124, a driver 125, an I/F 126, photocouplers 127 and 128, a CAN I/F 129, a driver 130, CAN I/Fs 131 and 132, an I/F 133, a driver 134, a photocoupler 135, and an I/F 136.

According to the third embodiment, the communication interrupt ECU 12 accepts a control signal from the remote control ECU 50 and generates control signals transmitted to the engine ECU 31 and the thruster ECUs 80 on the basis of the accepted control signal. The communication interrupt ECU 12 accepts an input of a control signal from the engine ECU 31 and outputs the control signal to the remote control ECU 50.

The communication interrupt ECU 12 is connected to the batteries 10*a* and 10*b* such that electric power is conveyed to the communication interrupt ECU 12. Specifically, a positive potential connected to a portion of the communication interrupt ECU 12 including the CAN I/F 129 with respect to the photocouplers 127 and 128 is varied from the potential of the battery 10*b* to 12Vb by the impedance and the flowing current of an electric power line. A negative (ground) potential connected to the portion of the communication interrupt ECU 12 including the CAN I/F 129 with respect to the photocouplers 127 and 128 is varied from the potential of the battery 10*b* to GND2 by the impedance and the flowing current of an electric power line. The supplied potential of 12Vb is reduced to 5Vb by the regulator 123.

A positive potential connected to a portion of the communication interrupt ECU 12 including the CPU 121 with respect to the photocouplers 127 and 128 is varied from the potential of the battery 10*a* to 12Va by the impedance and the flowing current of an electric power line. The supplied potential of 12Va is reduced to 5Va by the regulator 122.

The CPU 121 is communicatively connected to the CAN I/F 124, the driver 125, the I/F 126, the CAN I/Fs 131 and 132, the I/F 133, and the driver 134. The CPU 121 is connected to a potential of 5Va and a potential of GND1.

The CAN I/F 124 transmits and receives a signal of CAN communication. In other words, the CAN I/F 124 receives a CAN signal from the indicator 7 through a hub 11 and transmits a signal to the CPU 121. The CAN I/F 124 receives a signal from the CPU 121 and transmits a CAN signal to the indicator 7. The CAN I/F 124 is connected to a potential of 5Va and a potential of GND1.

The driver 125 receives a signal from the CPU 121 and drives an optical converter 127*a* of the photocoupler 127. The driver 125 is connected to a potential of 12Va and a potential of GND1. The I/F 126 receives a signal from an electrical converter 128*b* of the photocoupler 128 and transmits a signal to the CPU 121. The I/F 126 is connected to a potential of 5Va.

The photocouplers 127, 128, and 135 are provided on the communication path that connects the CPU 121 of the communication interrupt ECU 12 and the engine ECU 31 to convey a signal therebetween. In other words, the communication path that connects the CPU 121 and the engine ECU 31 conveys a signal while the CPU 121 and the engine ECU 31 are electrically separated (insulated) from each other by the photocouplers 127, 128, and 135. The photocouplers 127, 128, and 135 include optical converters 127*a*, 128*a*, and 135*a* that convert electrical signals to optical signals and electrical converters 127*b*, 128*b*, and 135*b* that convert optical signals to electrical signals, respectively.

The photocoupler 127 outputs a signal from the CPU 121 to the CAN I/F 129. Specifically, the optical converter 127*a* converts an electrical signal output through the driver 125 from the CPU 121 to an optical signal. Then, the electrical converter 127*b* receives the optical signal output from the optical converter 127*a*, converts the optical signal to an electrical signal again, and outputs the electrical signal to the CAN I/F 129. The optical converter 127*a* of the photocoupler 127 connected to the CPU 121 is grounded (connected) to a potential of GND1. On the other hand, the electrical converter 127*b* of the photocoupler 127 connected to the engine ECU 31 is grounded (connected) to a potential of GND2.

The photocoupler 128 outputs a signal from the CAN I/F 129 to the CPU 121. Specifically, the optical converter 128*a* converts an electrical signal output through the driver 130 from the CAN I/F 129 to an optical signal. Then, the electrical converter 128*b* receives the optical signal output from the optical converter 128*a*, converts the optical signal to an electrical signal again, and outputs the electrical signal to the CPU 121 through the I/F 126. The electrical converter 128*b* of the photocoupler 128 connected to the CPU 121 is grounded (connected) to a potential of GND1. On the other hand, the optical converter 128*a* of the photocoupler 128 connected to the engine ECU 31 is grounded (connected) to a potential of GND2.

The CAN I/F 129 transmits and receives a signal of CAN communication. In other words, the CAN I/F 129 receives a CAN signal from the engine ECU 31 and transmits a signal to the CPU 121. The CAN I/F 129 receives a signal from the CPU 121 and transmits a CAN signal to the engine ECU 31. The CAN I/F 129 is connected to a potential of 5Vb and a potential of GND2.

The driver 130 receives a signal from the CAN I/F 129 and drives the optical converter 128*a* of the photocoupler

128. The driver 130 is connected to a potential of 12Vb and a potential of GND2. The CAN I/F 131 transmits and receives a signal of CAN communication. In other words, the CAN I/F 131 receives CAN signals from the thruster ECUs 80 and transmits a signal to the CPU 121. The CAN I/F 131 receives a signal from the CPU 121 and transmits CAN signals to the thruster ECUs 80. The CAN I/F 131 is connected to a potential of 5Va and a potential of GND1. The CAN I/F 132 transmits and receives a signal of CAN communication. In other words, the CAN I/F 132 receives a CAN signal from the remote control ECU 50 and transmits a signal to the CPU 121. The CAN I/F 132 receives a signal from the CPU 121 and transmits a CAN signal to the remote control ECU 50. The CAN I/F 132 is connected to a potential of 5Va and a potential of GND1.

The I/F 133 receives a start/stop signal for the outboard motor 3 (engine 30) from the remote control ECU 50 and transmits a signal to the CPU 121. The I/F 133 is connected to a potential of 12Va and a potential of GND1. The driver 134 receives a signal from the CPU 121 and drives the optical converter 135a of the photocoupler 135. The driver 134 is connected to a potential of 12Va and a potential of GND1.

The photocoupler 135 outputs a start/stop signal for the outboard motor 3 (engine 30) from the CPU 121 to the I/F 136. Specifically, the optical converter 135a converts an electrical signal output through the driver 134 from the CPU 121 to an optical signal. Then, the electrical converter 135b receives the optical signal output from the optical converter 135a, converts the optical signal to an electrical signal again, and outputs the electrical signal to the I/F 136. The optical converter 135a of the photocoupler 135 connected to the CPU 121 is grounded (connected) to a potential of GND1. On the other hand, the electrical converter 135b of the photocoupler 135 connected to the engine ECU 31 is grounded (connected) to a potential of GND2.

The I/F 136 receives a signal from the electrical converter 135b of the photocoupler 135 and transmits a signal to the engine ECU 31. The I/F 136 is connected to a potential of 12Vb and a potential of GND2.

The remaining structure of the boat maneuvering system 300 according to the third embodiment is similar to that of the boat maneuvering system 100 according to the aforementioned first embodiment.

According to the third embodiment, the following effects are obtained.

According to the third embodiment, as hereinabove described, the communication interrupt ECU 12 that accepts the control signal from the remote control ECU 50 and generates the control signal output to the engine ECU 31 and the control signals output to the thrusters 8a and 8b are provided on the communication paths 9a and 9b between the engine ECU 31 and the remote control ECU 50. Thus, even when the thrusters 8a and 8b are newly added to the existing boat maneuvering system 100a, the communication interrupt ECU 12 generates the control signal (relays the control signal) on the basis of the control signal for operation of the outboard motor 3 by an existing operating device and enables the operation of the outboard motor 3 by the existing operating device. The communication interrupt ECU 12 generates the control signals for operation of the thrusters 8a and 8b and the outboard motor 3 by the operating devices (the steering wheel 4 and the remote controller 5) and enables the operation of the thrusters 8a and 8b and the outboard motor 3 by the operating devices. Consequently, a new power source is easily added to the existing boat maneuvering system 100a.

The remaining effects of the third embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the steering wheel and the remote controller are employed as the first operating device in each of the aforementioned first to third embodiments, the present invention is not restricted to this. According to the present invention, the first operating device may alternatively include at least one of the steering wheel and the remote controller, or another device other than the steering wheel and the remote controller may alternatively be employed as the first operating device.

While the outboard motor(s) including the engine(s) is employed as the first power source in each of the aforementioned first to third embodiments, the present invention is not restricted to this. According to the present invention, the first power source may alternatively be a power source other than the outboard motor(s) or an outboard motor including an electric motor.

While the present invention is applied to the boat maneuvering system in which the single outboard motor (first power source) is provided in each of the aforementioned first and third embodiments and the present invention is applied to the boat maneuvering system in which the two outboard motors (power sources) are provided in the aforementioned second embodiment, the present invention is not restricted to this. The present invention may alternatively be applied to a boat maneuvering system in which three or more power sources are provided.

While the thrusters are employed as the second power source in one of the aforementioned first and third embodiments, the present invention is not restricted to this. According to the present invention, the second power source may alternatively be a trolling motor or the outboard motor, for example. One second power source or three or more second power sources may alternatively be provided. Furthermore, the two thrusters are configured to be turned, but one or both of the two thrusters may alternatively be fixed without having a turning function.

While the joystick is employed as the second operating device in each of the aforementioned first and second embodiments, the present invention is not restricted to this. According to the present invention, a device other than the joystick may alternatively be employed as the second operating device.

While the photocouplers are provided between the CPU of the third controller and the first controller (engine ECU) in each of the aforementioned first to third embodiments, the present invention is not restricted to this. According to the present invention, the CPU of the third controller and the first controller may alternatively be communicatively connected to each other without being electrically insulated from each other by the photocouplers.

It should be understood, that the invention is not necessarily limited to the specific process, arrangement, materials and components shown and described above, but may be susceptible to numerous variations within the scope of the invention.

What is claimed is:

1. A boat maneuvering system for maneuvering a boat, comprising:
   a first power source mountable on a body of the boat;

a first controller, including a first central processing unit (CPU), configured to control the first power source;

a first operating device configured to operate the first power source;

a second controller, including a second CPU, configured to receive a first operation instruction via the first operating device, and to output a first control signal for controlling the first power source;

a communication path that connects the first controller and the second controller to convey a signal therebetween;

a second power source provided separately from the first power source;

a second operating device provided separately from the first operating device for operating the first and second power sources; and a third controller, including a third CPU, provided on the communication path connecting the first and second controllers, the third controller being configured to receive the first control signal from the second controller, to generate a second control signal, and to output the second control signal to the first controller, and to receive a second operation instruction via the second operating device, to generate a third control signal, and to output the third control signal to the second power source.

2. The boat maneuvering system according to claim 1, wherein the first operating device includes at least one of a remote controller and a steering wheel.

3. The boat maneuvering system according to claim 1, wherein the second operating device includes a joystick, and the third controller is configured to generate the second and third control signals on the basis of operation by the joystick.

4. The boat maneuvering system according to claim 1, wherein the third controller is configured to receive a fourth control signal from the first controller and to output the fourth control signal to the second controller.

5. The boat maneuvering system according to claim 1, wherein the third controller is configured to be inoperable by the second operating device when the first operating device is operated and the first control signal is output from the second controller.

6. The boat maneuvering system according to claim 1, wherein the third controller is configured to switch an operation mode of the boat maneuvering system between a first mode of operation by the first operating device and a second mode of operation by the second operating device, and accept the operation by the second operating device only when the second mode is selected.

7. The boat maneuvering system according to claim 6, wherein the first operating device includes a remote controller, and the third controller is configured to switch the operation mode from the first mode to the second mode when the remote controller is at a neutral position.

8. The boat maneuvering system according to claim 6, wherein the third controller is configured to switch the operation mode from the second mode to the first mode when the first operating device is operated in a forward movement direction or a reverse movement direction while the operation mode is the second mode.

9. The boat maneuvering system according to claim 6, wherein the second control signal includes at least a start signal and a stop signal for the first power source, and the third controller is configured to output the stop signal to the first controller when the first mode is switched to the second mode.

10. The boat maneuvering system according to claim 9, wherein the third controller is configured to output the start signal to the first controller when the second mode is switched to the first mode.

11. The boat maneuvering system according to claim 6, wherein the first power source includes a plurality of first power sources, the second control signal includes a plurality of different second control signals, and the third controller is configured to output the plurality of second control signals to the plurality of first power sources in the second mode.

12. The boat maneuvering system according to claim 11, wherein the first controller includes a plurality of first controllers, each of the plurality of first power sources is provided with one of the first controllers, and the third controller is arranged on the communication path between the plurality of first controllers and the second controller.

13. The boat maneuvering system according to claim 1, wherein the second power source includes at least one of a thruster and a trolling motor.

14. The boat maneuvering system according to claim 1, wherein the first power source includes an engine, the first operating device includes a drive-by-wire remote controller and is configured to output at least an engine start signal for the first power source, and the third controller is configured to accept the engine start signal from the first operating device and to output the engine start signal to the first controller.

15. A boat maneuvering system for maneuvering a boat, comprising:

a power source mountable on a body of the boat;

a first controller, including a first central processing unit (CPU), configured to control the power source;

a first operating device configured to operate the power source;

a second controller, including a second CPU, configured to accept a first operation instruction and to output a first control signal for controlling the first power source;

a communication path that connects the first controller and the second controller to convey a signal therebetween;

a second operating device provided separately from the first operating device for operating the power source; and a third controller, including a third CPU, that is provided on the communication path, the third controller being configured to receive the first control signal from the second controller, to generate a second control signal, and to output the second control signal to the first controller, and to receive a second operation instruction via the second operating device, to generate a third control signal, and to output the third control signal to the first controller.

16. The boat maneuvering system according to claim 15, wherein the first operating device includes at least one of a remote controller and a steering wheel.

17. The boat maneuvering system according to claim 15, wherein the second operating device includes a joystick.

18. The boat maneuvering system according to claim 15, wherein the third controller is configured to receive a fourth control signal from the first controller and to output the fourth control signal to the second controller.

19. The boat maneuvering system according to claim 15, wherein the third controller is configured to be inoperable by the second operating device when the first operating device is operated and the first control signal is output from the second controller.

20. The boat maneuvering system according to claim 15, wherein the third controller is configured to
  switch an operation mode of the boat maneuvering system between a first mode of operation by the first operating device and a second mode of operation by the second operating device, and
  accept the operation by the second operating device only when the second mode is selected.

21. The boat maneuvering system according to claim 20, wherein
  the first operating device includes a remote controller, and
  the third controller is configured to switch the operation mode from the first mode to the second mode when the remote controller is at a neutral position.

22. The boat maneuvering system according to claim 20, wherein the third controller is configured to switch the operation mode from the second mode to the first mode when the first operating device is operated in a forward movement direction or a reverse movement direction while the operation mode is the second mode.

23. The boat maneuvering system according to claim 20, wherein
  the power source includes a plurality of power sources,
  the second control signal includes a plurality of different second control signals, and
  the third controller is configured to output the plurality of second control signals to the plurality of power sources in the second mode.

24. The boat maneuvering system according to claim 23, wherein
  the first controller includes a plurality of first controllers,
  each of the plurality of power sources is provided with one of the first controllers, and
  the third controller is arranged on the communication path between the plurality of first controllers and the second controller.

25. A boat maneuvering system for maneuvering a boat, comprising:
  a first power source mountable on a body of the boat;
  a first controller, including a first central processing unit (CPU), configured to control the first power source;
  an operating device configured to operate the first power source;
  a second controller, including a second CPU, configured to receive a first operation instruction via the operating device and to output a first control signal for controlling the first power source;
  a communication path that connects the first controller and the second controller to convey a signal therebetween;
  a second power source provided separately from the first power source; and
  a third controller, including a third CPU, provided on the communication path, the third controller being configured
    to accept the first control signal from the second controller,
    to generate a second control signal, and to output the second control signal to the first controller, and
    to generate a third control signal, and to output the third control signal to the second power source.

26. The boat maneuvering system according to claim 25, wherein the second power source includes at least one of a thruster and a trolling motor.

27. The boat maneuvering system according to claim 25, wherein
  the first power source includes an engine,
  the operating device includes a drive-by-wire remote controller and is configured to output at least an engine start signal for the first power source, and
  the third controller is configured to receive the engine start signal from the operating device, and to output the engine start signal to the first controller.

* * * * *